United States Patent
Takeda

(10) Patent No.: US 7,746,527 B2
(45) Date of Patent: Jun. 29, 2010

(54) OPTICAL SCANNING DEVICE USING MODULATED LASER BEAMS CONTROL METHOD OF OPTICAL SCANNING DEVICE USING MODULATED LASER BEAMS, AND IMAGE DISPLAY APPARATUS USING MODULATED LASER BEAMS, THE SYSTEM INCLUDING RESPECTIVE GRADATION OF EACH PIXEL BY THE LIGHT BEAMS AND SUCCESSIVELY ILLUMINATING EACH PIXEL OF THE PLURALITY OF PIXELS

(75) Inventor: Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1022 days.

(21) Appl. No.: 11/355,998

(22) Filed: Feb. 17, 2006

(65) Prior Publication Data
US 2006/0233208 A1    Oct. 19, 2006

(30) Foreign Application Priority Data
Apr. 15, 2005    (JP)    ............................... 2005-117876

(51) Int. Cl.
   G02B 26/10    (2006.01)
(52) U.S. Cl. ................................. 359/202.1; 359/224.1
(58) Field of Classification Search .............. 359/197.1, 359/198.1, 199.3, 202.1, 212.1, 213.1, 214.1, 359/220.1, 224.1–224.2; 250/234; 347/224–264
   See application file for complete search history.

(56) References Cited

U.S. PATENT DOCUMENTS

| 6,059,188 | A  | * | 5/2000 | diFazio et al. .......... 235/462.36 |
| 6,346,957 | B1 | * | 2/2002 | Maruyama ................... 347/115 |
| 6,744,037 | B2 | * | 6/2004 | Yoshikawa et al. .......... 250/234 |
| 6,842,274 | B2 | * | 1/2005 | Akatsu et al. ............. 359/204.1 |
| 6,972,737 | B2 |   | 12/2005 | Furukawa et al. |
| 2001/0050928 | A1 | * | 12/2001 | Cayrefourcq et al. ......... 372/12 |
| 2002/0050956 | A1 |   | 5/2002 | Gerhard et al. |
| 2004/0053143 | A1 | * | 3/2004 | Sandstrom ...................... 430/5 |
| 2004/0196518 | A1 | * | 10/2004 | Wine et al. .................. 359/197 |
| 2006/0285186 | A1 | * | 12/2006 | Ishida et al. ................ 359/204 |

FOREIGN PATENT DOCUMENTS

| JP | 2001-267681 | 9/2001 |
| JP | 2002-350757 | 12/2002 |
| JP | A 2003-21804 | 1/2003 |
| JP | 2003-172900 | 6/2003 |

* cited by examiner

Primary Examiner—Alessandro Amari
Assistant Examiner—Jennifer L. Doak
(74) Attorney, Agent, or Firm—Oliff & Berridge, PLC

(57) ABSTRACT

An optical scanning device includes a plurality of light source sections for supplying beams, and a scanning section for directing beams emitted from the light source sections to scan in a first direction and a second direction substantially perpendicular to the first direction on a beam-receiving region. The scanning section is operated such that a frequency at which beams scan in the first direction is higher than a frequency at which beams scan in the second direction. The light source sections are disposed such that an array of spots produced from supplied beams can be positioned on the beam-receiving region in the first and second directions. Gradations are represented using beams for producing spots positioned in parallel on the beam-receiving region in the first direction.

9 Claims, 14 Drawing Sheets

OPTICAL SCANNING DEVICE USING MODULATED LASER BEAMS CONTROL METHOD OF OPTICAL SCANNING DEVICE USING MODULATED LASER BEAMS, AND IMAGE DISPLAY APPARATUS USING MODULATED LASER BEAMS, THE SYSTEM INCLUDING RESPECTIVE GRADATION OF EACH PIXEL BY THE LIGHT BEAMS AND SUCCESSIVELY ILLUMINATING EACH PIXEL OF THE PLURALITY OF PIXELS

BACKGROUND

1. Technical Field

The present invention relates to an optical scanning device, a control method of an optical scanning device, and an image display apparatus, and more particularly to an improvement of an optical scanning device which provides laser beam scan using laser beams modulated according to image signals for the purpose of image display.

2. Related Art

An image display apparatus which displays images by laser beam scan uses an optical scanning device capable of providing laser beam scan. The optical scanning device executes scan using laser beams modulated according to image signals scan in the two-dimensional direction. The image display apparatus displays images by introducing the laser beams released from the optical scanning device to a screen or the like. For modulating laser beams, pulse width modulation (hereinafter referred to as "PWM") is generally used. The PWM varies the pulse width during which laser beams are turned on in accordance with image signals. For representing gradations of all pixels in one frame of an image in accordance with image signals, the minimum unit pulse width needs to be extremely small. The minimum unit pulse width further decreases as the number of pixels and the number of gradations in the image increase. However, it is extremely difficult to accurately switch on and off a high-output laser beam source at high speed in accordance with small pulse widths. Thus, when it is difficult to raise modulation frequencies, a plurality of laser beams are used so that scan can be divided among the plural beams modulated according to image signals. For example, in the optical scanning device which provides laser beam scan on the beam-receiving region in the horizontal and vertical directions, scanning can be divided among a plurality of laser beams arranged in parallel in the vertical direction when the frequency at which laser beams scan in the horizontal direction is higher than the frequency at which laser beams scan in the vertical direction. When the plural laser beams are arranged in parallel in the vertical direction, images can be displayed at a lower modulation frequency than in the case where a single laser beam scans. However, large clearances are produced between tracks formed by a group of spots in the beam-receiving region. These clearances become larger as the number of laser beams arranged in parallel increases. Also, scan in the horizontal direction deviates from the horizontal direction of the screen and is obliquely performed. When the clearances between scanning tracks of laser beams become conspicuous, high-quality images cannot be obtained. For providing laser beam scan without generating noticeable clearances, the method has been considered as a solution that the same number of light sources as that of the scanning lines in either the horizontal or vertical direction are equipped to perform laser beam scan only in one direction. JP-A-2003-21804 proposes such a technique using the same number of light sources as that of the scanning lines, for example.

When the same number of light sources as that of the scanning lines are equipped, however, a considerable number of light sources are required and the optical scanning device including these is extremely expensive. As obvious, there has been arising a problem that high quality images are difficult to be displayed when the technique of divided scan using a plurality of beams is used.

SUMMARY

Accordingly, an advantage of some aspects of the invention is to provide an optical scanning device, a control method of an optical scanning device, and an image display apparatus using the optical scanning device, capable of providing scan which is divided among a plurality of beams so as to display high quality images.

An optical scanning device according to a first aspect of the invention includes: a plurality of light source sections for supplying beams; and a scanning section for directing beams emitted from the light source sections to scan on a beam-receiving region in a first direction and a second direction substantially perpendicular to the first direction. The scanning section is operated such that a frequency at which beams scan in the first direction is higher than a frequency at which beams scan in the second direction. The light source sections are disposed such that an array of spots produced from beams can be positioned on the beam-receiving region in the first direction and the second direction. Gradations are represented using a plurality of beams for producing spots positioned in parallel on the beam-receiving region in the first direction.

The frequency at which beams scan in the horizontal direction as the first direction is higher than the frequency at which beams scan in the vertical direction as the second direction. Spots formed by beams are disposed on the beam-receiving region in both the horizontal direction and the vertical direction. Since a plurality of beams are used, scan can be divided among beams modulated according to image signals and thus images can be displayed at a lower modulation frequency than that in the case of scan by a single beam. Moreover, since spots are produced in parallel in the horizontal direction as well as in the vertical direction, clearances produced between tracks of the group of spots can be reduced compared with the case where spots are produced in parallel only in the vertical direction and thus high quality images can be displayed. Furthermore, since gradations are represented using a plurality of beams for producing spots in parallel on the beam-receiving region in the horizontal direction, image can be displayed using the plural light source sections for producing spots in parallel in the horizontal direction. Gradation representation using the plural beams is performed by dividing gradation representation among the respective laser beams which are so modulated as to represent corresponding parts of gradations when the laser beams scan a certain pixel position.

In the structure according to the first aspect of the invention, since gradations are represented using beams from the plural light source sections, power required for gradation representation can be dividedly obtained from the plural light source sections. As a result, output of the light source sections can be reduced compared with the case where all gradations are represented using a single beam emitted from a single light source section. For representing gradations using a plurality of beams, in such a case for representing 8-bit gradations using four light source sections, gradations are divided into parts of 64 gradations, each of which parts is represented using one light source section. In this case, the light source sections other than the light source section for representing gradations ranging from 1 to 63 gradations are required to indicate only ON/OFF of 64 gradations. As for the light source section for representing gradations ranging from 1 to 63 gradations, the minimum unit pulse width can be increased to four times the minimum unit pulse width in the related art by decreasing the amplitude of pulse signals to one fourth of the amplitude of pulse signals in the related art. As a result, images can be displayed at a lower modulation frequency than that in the case of scan by a single beam. Since images are displayed at a lower modulation frequency, beams can be securely modulated according to image signals and thus high quality images can be displayed. Accordingly, an optical scanning device capable of dividing scan among a plurality of beams and thus displaying high quality images can be provided.

According to the first aspect of the invention, it is preferable that beams scan in the first direction at intervals of lines which number is the same as that of spots positioned in parallel on the beam-receiving region in the second direction. In this structure, images can be displayed using the plural light source sections for producing an array of spots on the beam-receiving region in both the first direction and the second direction.

According to the first aspect of the invention, it is preferable that beams scan in the first direction at intervals of lines which number is smaller than that of spots positioned in parallel on the beam-receiving region in the second direction. In this structure, images can be displayed using the plural light source sections for producing an array of spots on the beam-receiving region in both the first direction and the second direction.

According to the first aspect of the invention, it is preferable that the scanning section directs beams to scan in the first direction at intervals of n lines (n: positive integer) on the beam-receiving region. It is also preferable that the light source sections produce m×n spots (m: positive integer) in parallel on the beam-receiving region in the second direction, and provide gradation representation using m pieces of the light source sections which are selected for each k and produce spots on the (hn−k)th line (k=0, 1, up to n−1; h=1, 2, up to m) in the second direction. For example, by scan performed at intervals of two lines on the beam-receiving region in the first direction using an array of 4×4 light source sections, images can be displayed using the plural light source sections for producing an array of spots on the beam-receiving region in the first and second directions. In this embodiment, gradations are represented using the group of the light source sections having a plurality of lines for producing spots in parallel in the first direction, and therefore using a greater number of light source sections than in the case of using the group of the light source sections having a single line. Accordingly, images can be displayed at a lower modulation frequency.

According to the first aspect of the invention, it is preferable that the optical scanning device further includes a backup light source section which supplies beams in substitution for any of the plural light source sections producing spots in parallel in the first direction. While the light source sections other than the backup light source section are normally supplying beams having at least predetermined intensity, the backup light source section is not operated. When any of the light source sections other than the backup light source section supplies smaller amount of beams or is not turned on, the backup light source section supplies beams in place of this light source section. Thus, images can be continuously displayed even when any of the light source sections is abnormal and does not supply beams having at least the predetermined intensity. Moreover, since the backup light source section is disposed next to the plural light source sections for producing spots in parallel in the first direction, the backup light source section can easily substitute for the abnormal light source section. The backup light source section may substitute for the light source section which is defective at the time of manufacture as well as for the light source section which cannot normally supply beams having at least the predetermined intensity after manufacture. By actuating the backup light source in substitution for the light source section which is detective at the time of manufacture, yield increases. As a result, the reliability of the optical scanning device can be enhanced.

According to the first aspect of the invention, it is preferable that the optical scanning device further includes a light detection section for detecting beams emitted from the light source sections. The backup light source section supplies beams in substitution for any of the plural light source sections which is determined as a light source section supplying beams having intensity lower than a predetermined value based on detection results from the light detection section. By specifying the light source section which cannot supply beams having the predetermined intensity, the backup light source section can be promptly actuated in substitution for the abnormal light source section. Thus, any faulty light source section can be immediately restored.

A control method of an optical scanning device according to a second aspect of the invention includes: a beam supplying step for supplying beams from a plurality of light source sections; and a scanning step for directing beams supplied in the beam supplying step to scan on a beam-receiving region in a first direction and a second direction substantially perpendicular to the first direction. A frequency at which beams scan in the first direction is higher than a frequency at which beams scan in the second direction in the scanning step. An array of spots produced from supplied beams are disposed on the beam-receiving region in the first direction and the second direction, and gradations are represented using beams for producing spots positioned in parallel on the beam-receiving region in the first direction in the beam supplying step.

The frequency at which beams scan in the horizontal direction as the first direction is higher than the frequency at which beams scan in the vertical direction as the second direction in the scanning step. The spots formed on the beam-receiving region are disposed in both the horizontal direction and the vertical direction. Since a plurality of beams are used, scan can be divided among beams modulated according to image signals and images can be thus displayed at a lower modulation frequency than that in the case of scan by a single beam. Moreover, since spots are produced in parallel in the horizontal direction as well as in the vertical direction, clearances produced between tracks of the group of spots can be reduced compared with the case where spots are produced in parallel only in the vertical direction and thus high quality images can be displayed. Furthermore, since gradations are represented using a plurality of beams positioned in parallel on the beam-receiving region in the horizontal direction, image can be displayed using the plural light source sections for producing spots in parallel in the horizontal direction.

Since gradations are represented using beams from the plural light source sections, power required for gradation representation can be dividedly obtained from the plural light source sections in the beam supplying step. As a result, output of the light source sections can be reduced compared with the case where all gradations are represented using a single beam emitted from a single light source section. In the structure where gradations are represented using beams from the plural light source sections, each part of gradations is represented using one light source section and therefore images can be displayed at a lower modulation frequency than that in the case of scan by a single beam. Since images are displayed at a lower modulation frequency, beams can be securely modulated according to image signals and thus high quality images can be displayed. Accordingly, scan can be divided among a plurality of beams and thus high quality images can be displayed.

According to the second aspect of the invention, it is preferable that the control method further includes: a detection step for detecting beams emitted from the light source sections; a specifying step for specifying any of the plural light source sections which is supplying beams having intensity lower than a predetermined value based on detection results obtained in the detection step; and a substituting step for supplying beams from a backup light source section in substitution for the light source section specified from the plural light source sections for producing spots in parallel in the first direction in the specifying step. While the light source sections other than the backup light source section are normally supplying beams having at least predetermined intensity, the backup light source section is not operated. When any of the light source sections other than the backup light source section supplies smaller amount of beams or is not turned on, the backup light source section supplies beams in place of the light source section in the substituting step. Thus, images can be continuously displayed even when any of the light source sections is abnormal and does not supply beams having at least the predetermined intensity.

By specifying the light source section which cannot supply beams having at least the predetermined intensity in the specifying step, the backup light source section can be promptly operated in substitution for the abnormal light source section. The backup light source section may substitute for the light source section which is defective at the time of manufacture as well as for the light source section which cannot normally supply beams having at least the predetermined intensity after manufacture. By actuating the backup light source in substitution for the light source section which is detective at the time of manufacture, yield increases. As a result, the reliability can be enhanced and any faulty light source section can be promptly restored.

An image display apparatus for displaying images using light emitted from an optical scanning device according to a third aspect of the invention includes the optical scanning device described above. By using the above optical scanning device, scan can be divided among a plurality of beams and thus high quality images can be displayed. Therefore, an image display apparatus capable of displaying high quality images can be provided.

BRIEF DESCRIPTION OF THE DRAWINGS

The invention will be described with reference to the accompanying drawings, wherein like numbers refer to like elements.

DESCRIPTION OF EXEMPLARY EMBODIMENTS

A several embodiments according to the invention are hereinafter described in detail with reference to the drawings.

First Embodiment

Figure 1:
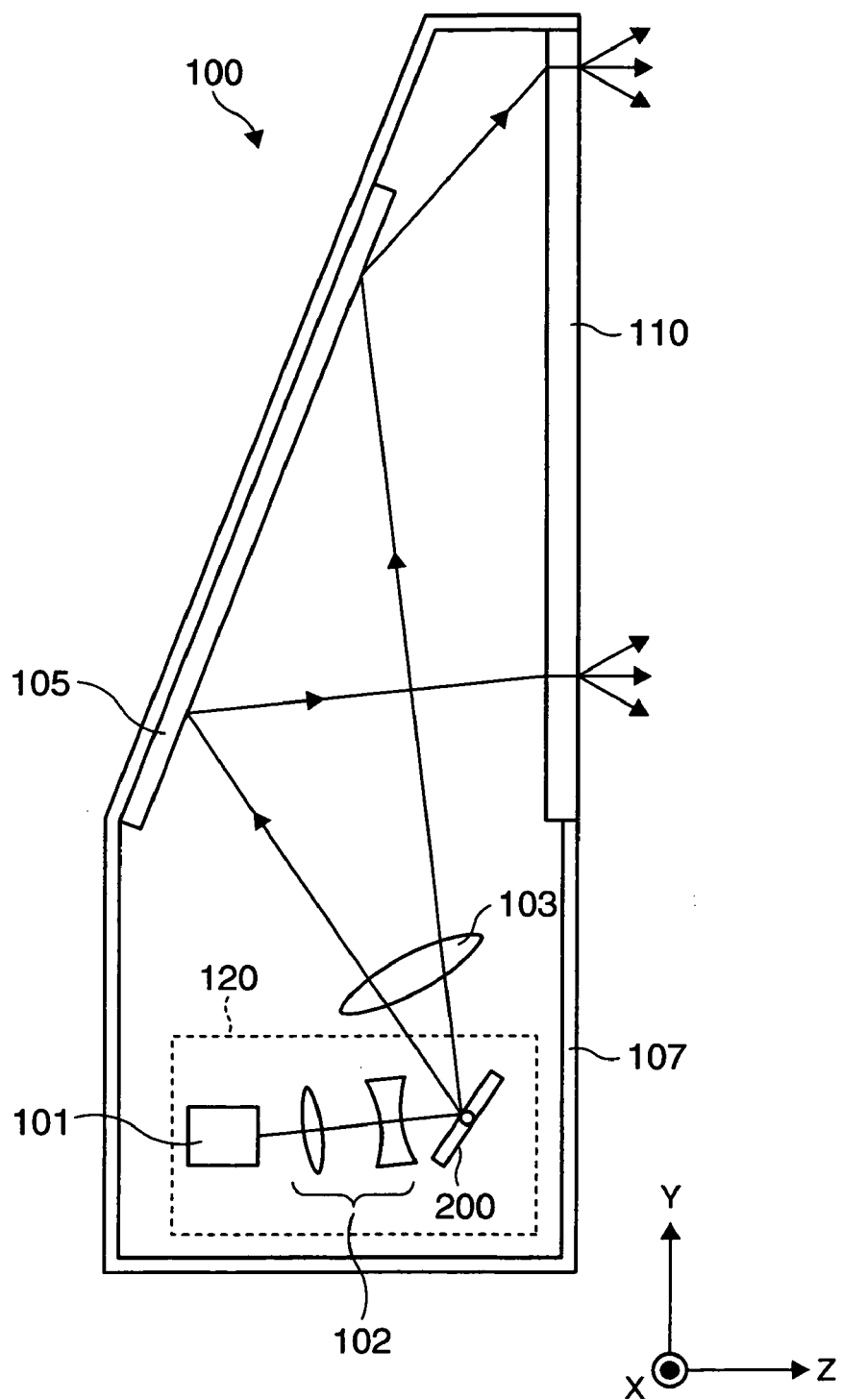
FIG. 1 schematically illustrates a structure of an image display apparatus in a first embodiment according to the invention.

FIG. 1 schematically illustrates an image display apparatus 100 in a first embodiment according to the invention. The image display apparatus 100 is a so-called rear projector which supplies laser beams on one surface of a screen 110 and releases light from the other surface of the screen 110 so that the observer can watch the light as images. An optical scanning device 120 equipped on the image display apparatus 100 provides laser beam scan using a scanning section 200. The optical scanning device 120 includes a light source array 101, a projection optical system 102, and the scanning section 200. The image display apparatus 100 displays images by introducing beams released from the optical scanning device 120 through the screen 110.

The light source array 101 has a plurality of light source sections for modulating laser beams as beams of light according to image signals and supplying the modulated laser beams. The structure of the light source array 101 will be described later. The laser beams emitted from the light source array 101 pass through the projection optical system 102, and enters the scanning section 200. The scanning section 200 directs the laser beams coming from the light source array 101 to scan.

Figure 2:
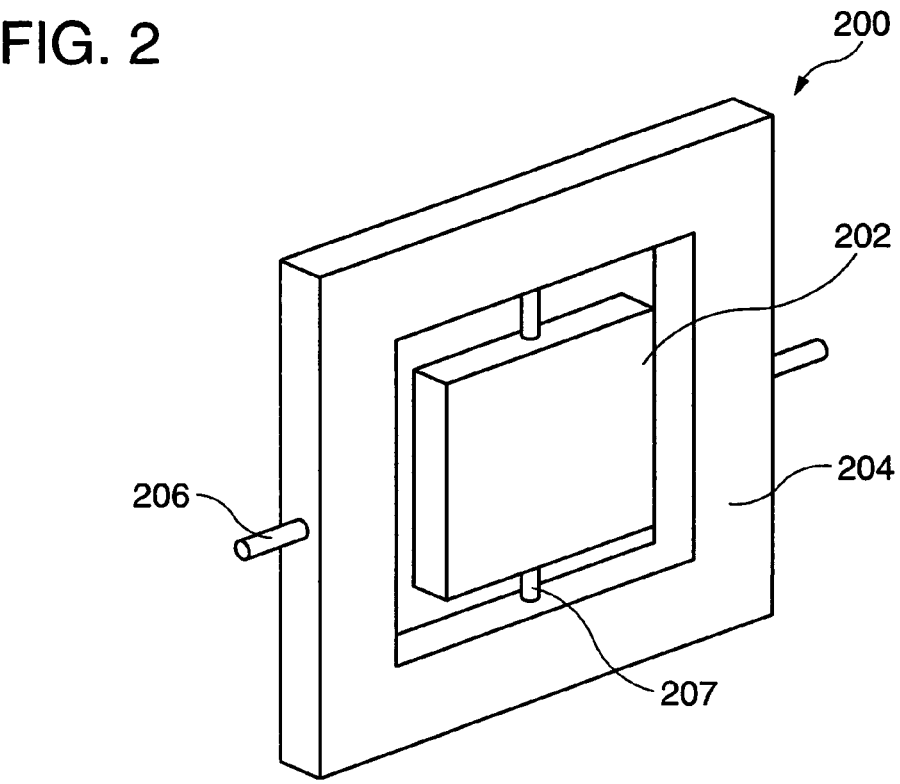
FIG. 2 schematically illustrates a scanning section.

FIG. 2 schematically illustrates the scanning section 200. The scanning section 200 has a so-called dual gimbal structure which has a reflection mirror 202 and an outer frame 204 surrounding the reflection mirror 202. The outer frame 204 is connected with not-shown fixing portions through torsion springs 206 as the rotation axis. The outer frame 204 rotates around the torsion springs 206 utilizing distortion and restoration to the original state of the torsion springs 206. The reflection mirror 202 is connected with the outer frame 204 via torsion springs 207 as the rotation axis substantially perpendicular to the torsion springs 206. The reflection mirror 202 reflects the laser beams emitted from the light source array 101. The reflection mirror 202 is formed by a high-reflective component having thin metal films such as aluminum and silver, for example.

With rotation of the outer frame 204 around the torsion springs 206, the reflection mirror 202 shifts such that the laser beams can scan on the screen 110 in a Y direction (see FIG. 1). The reflection mirror 202 rotates around the torsion springs 207 utilizing distortion and restoration to the original state of the torsion springs 207. By rotating around the torsion springs 207, the reflection mirror 202 shifts such that the laser beams reflected by the reflection mirror 202 can scan in an X direction. Thus, the scanning section 200 directs the laser beams emitted from the light source array 101 to scan on the screen 110 as the beam-receiving region in the X direction as the first direction and the Y direction as the second direction substantially perpendicular to the first direction.

Figure 3:
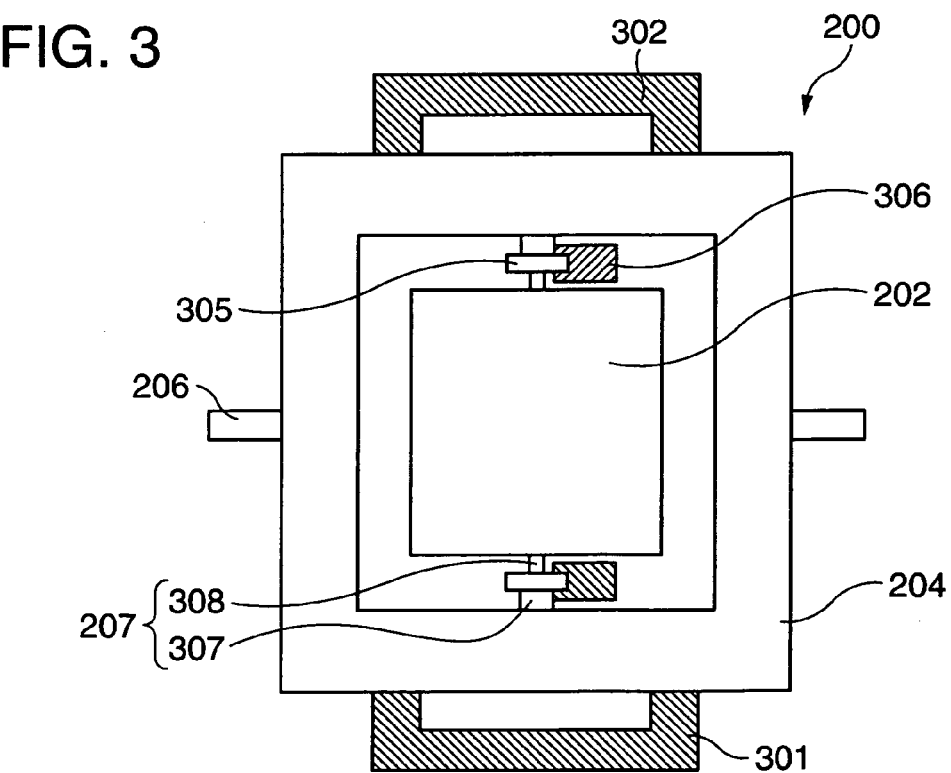
FIG. 3 shows a structure for actuating the scanning section.

FIG. 3 illustrates a structure for actuating the scanning section 200. When the surface of the reflection mirror 202 by which the laser beams are reflected is the front surface, first electrodes 301 and 302 are disposed in the space at the back of the outer frame 204 in positions substantially symmetric with respect to the torsion springs 206. When voltage is applied to the first electrodes 301 and 302, predetermined force such as electrostatic force in accordance with potential differences is generated between the first electrodes 301 and 302 and the outer frame 204. By alternately applying voltage to each of the first electrodes 301 and 302, the outer frame 204 rotates around the torsion springs 206.

Each of the torsion springs 207 is, more specifically, constituted by a first torsion spring 307 and a second torsion spring 308. A mirror side electrode 305 is provided between the first torsion spring 307 and the second torsion spring 308. A second electrode 306 is disposed in the space at the back of the mirror side electrode 305. When voltage is applied to the second electrode 306, predetermined force such as electrostatic force in accordance with potential differences is generated between the second electrode 306 and the mirror side electrode 305. When voltage of the same phase is applied to each of the second electrodes 306, the reflection mirror 202 rotates around the torsion springs 207. The scanning section 200 thus directs the laser beams to scan in the two-directional direction by the rotation of the reflection mirror 202. The scanning section 200 can be produced by using the technique of MEMS (micro electro mechanical systems), for example.

The scanning section 200 shifts the reflection mirror 202 such that the laser beams can reciprocate several times in the X direction as the horizontal direction while the laser beams scans once in the Y direction as the vertical direction in one frame period of an image, for example. Thus, the scanning section 200 is actuated such that the frequency at which the laser beams scan in the X direction as the first direction is higher than the frequency at which the laser beams scan in the Y direction as the second direction. For providing high-speed laser beam scan in the X direction, it is preferable that the scanning section 200 can resonate the reflection mirror 202 around the torsion springs 207. By resonating the reflection mirror 202, the shift amount of the reflection mirror can be increased. By increasing the shift amount of the reflection mirror 202, the scanning section 200 can efficiently direct the laser beams to scan with reduced energy. However, the reflection mirror 202 can be actuated without resonance.

The scanning section 200 is not limited to the type which is operated by electrostatic force in accordance with potential differences. For example, the scanning section 200 may be driven by electromagnetic force or by expansion force of a piezo-electric device. When electromagnetic force is used, the scanning section 200 can be operated by utilizing electromagnetic force generated between the reflection mirror 202 and a permanent magnet in accordance with electric current. The scanning section 200 may include a reflection mirror for directing laser beam scan in the x direction and a reflection mirror for directing laser beam scan in the Y direction.

Returning to FIG. 1, the laser beams coming from the scanning section 200 passe through a projection optical system 103 and enter a reflection section 105. The reflection section 105 is an inner surface of a housing 107 and is opposed to the screen 110. The reflection section 105 reflects the laser beams released from the optical scanning device 120 toward the screen 110. The housing 107 closes the inside space of the housing 107. The screen 110 is disposed on a predetermined surface of the housing 107. The screen 110 is a transmissive-type screen capable of transmitting laser beams modulated according to image signals and released from the optical scanning device 120. The beams reflected by the reflection section 105 enter the screen 110 from its surface on the inner side of the housing 107, and go out of the screen 110 from its surface on the observer side. The observer watches the light released from the screen 110 as images.

Figure 4:
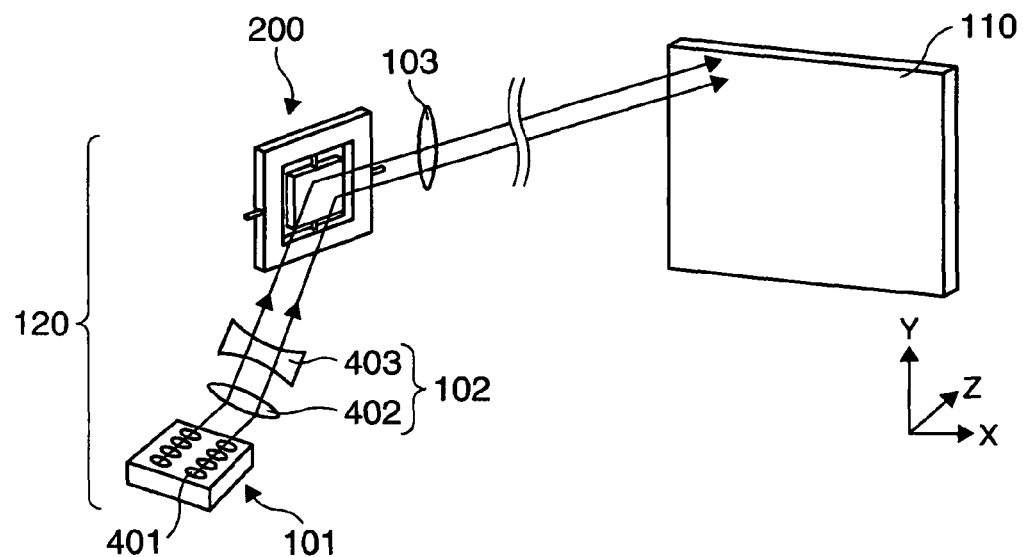
FIG. 4 shows a structure of a light source array and optical paths of laser beams.

FIG. 4 illustrates a structure of the light source array 101 and optical paths of laser beams emitted from the light source array 101. The light source array 101 is constituted by an array of eight light source sections 401. Each of the light source sections 401 may be formed by a semiconductor laser or a solid state laser equipped with a modulating section for modulating laser beams. The respective light source sections 401 modulate the laser beams using the PWM. The projection optical system 102 interposed between the light source array 101 and the scanning section 200 can be formed by a combination of a convex lens 402 and a concave lens 403. The projection optical system 102 releases the laser beams emitted from the respective light sources 401 approximately at the same intervals as those of pixel pitch by the converging function of the convex lens 402 and the diverging function of the concave lens 403.

The projection optical system 103 interposed between the scanning section 200 and the screen 110 directs the laser beams emitted from the light source sections 401 to create an image on the screen 110. By using the projection optical systems 102 and 103, highly precise images can be displayed on the screen 110. The light source array 101 shown in FIG. 4 is constituted by the light source sections 401 each of which supplies beams in the same frequency range. When R light, G light and B light are used for light source sections, for example, the light source array 101 is equipped for each color light. In this embodiment, the structure which supplies only a single color light is described and depicted.

Figure 5:
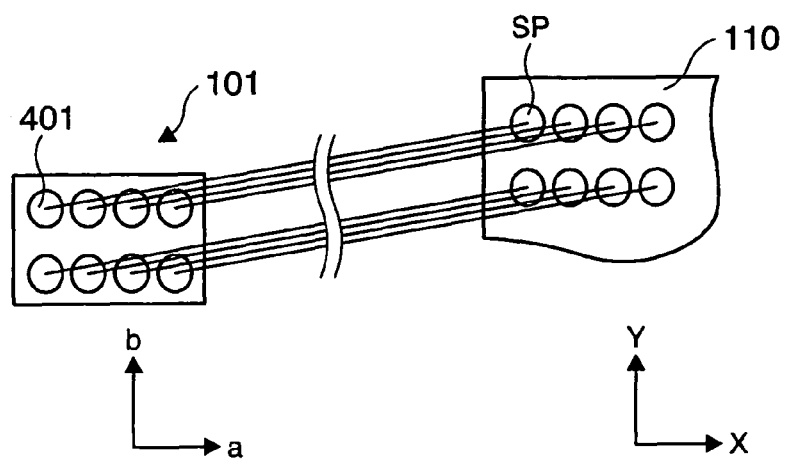
FIG. 5 shows positions of light source sections in the light source array.

FIG. 5 shows the positions of the light source sections 401 on the light source array 101. When a direction and b direction substantially perpendicular to the a direction on the light source array 101 correspond to the X direction and the Y direction of the screen 110, respectively, an array of the light source sections 401 are disposed such that four rows in the a direction and two rows in the b direction can be formed. Thus, laser beams emitted from the respective light sources 401 create an array of spots SP having four rows in the X direction and two rows in the Y direction on the screen 110. Accordingly, the light source sections are arranged such that an array of the spots produced by the laser beams can be positioned on the screen 110 as the beam-receiving region in the X and Y directions.

Figure 6:
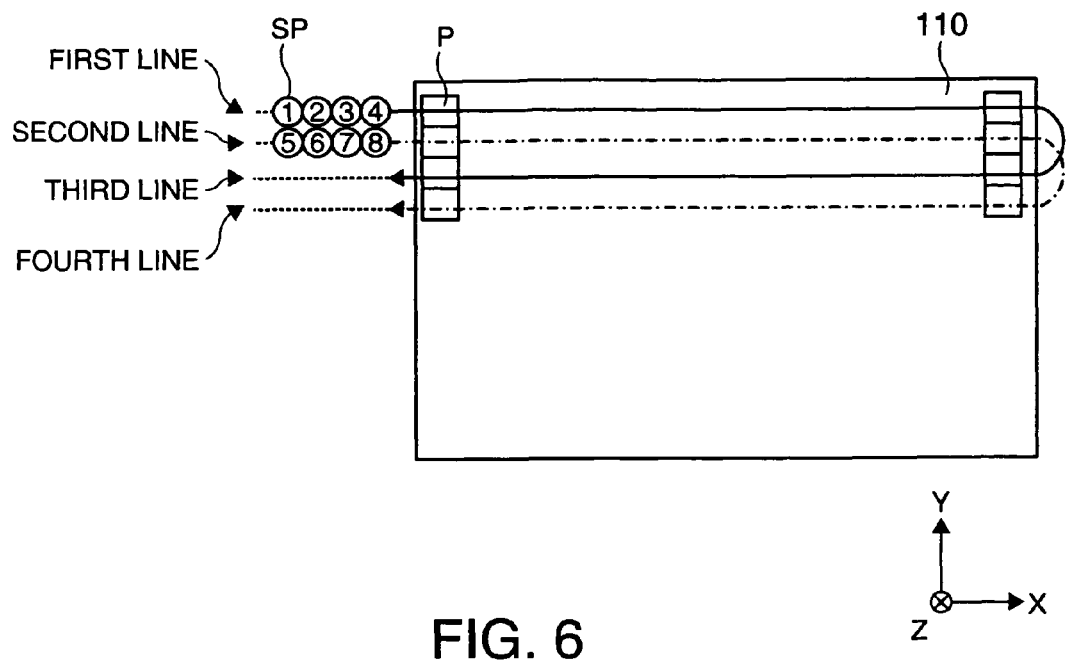
FIG. 6 shows scanning tracks of laser beams on a screen.

FIG. 6 illustrates scanning tracks of laser beams on the screen 110. In this embodiment, reference numerals 1 through 8 are given to the eight spots SP produced on the screen 110. The eight laser beams emitted from the light source array 101 start scanning from the upper left of the screen 110 as viewed from the beam entering side of the screen 110. When the scanning section 200 directs the respective laser beams to scan in the +X direction, four spots SP1, SP2, SP3 and SP4 shift on pixels P of the first line from above on the +Y side. Other four spots SP5, SP6, SP7 and SP8 shift on pixels P of the second line. When scan on the first line by the four spots SP1, SP2, SP3 and SP4 and scan on the second line by the four spots SP5, SP6, SP7 and SP8 are completed, the scanning section 200 changes the advancing direction of the respective laser beams from the +X direction to the −X direction.

While the direction of scan by the respective laser beams is changing from the +X direction to the −X direction, the scanning section 200 shifts the laser beams toward the −Y direction such that the four spots SP1, SP2, SP3 and SP4 can scan on the third line and the four spots SP5, SP6, SP7 and SP8 on the fourth line. Then, the four spots SP1, SP2, SP3 and SP4 shift on pixels P of the third line and the four spots SP5, SP6, SP7 and SP8 on pixels P of the fourth line in the −X direction. The scanning section 200 performs laser beam scan at intervals of two lines which is the same number as the number of rows of the spots positioned in parallel on the screen 110 in the Y direction. By repeating these processes, the optical scanning device 120 completes laser beam scan substantially on the entire surface of the screen 110.

Figure 7:
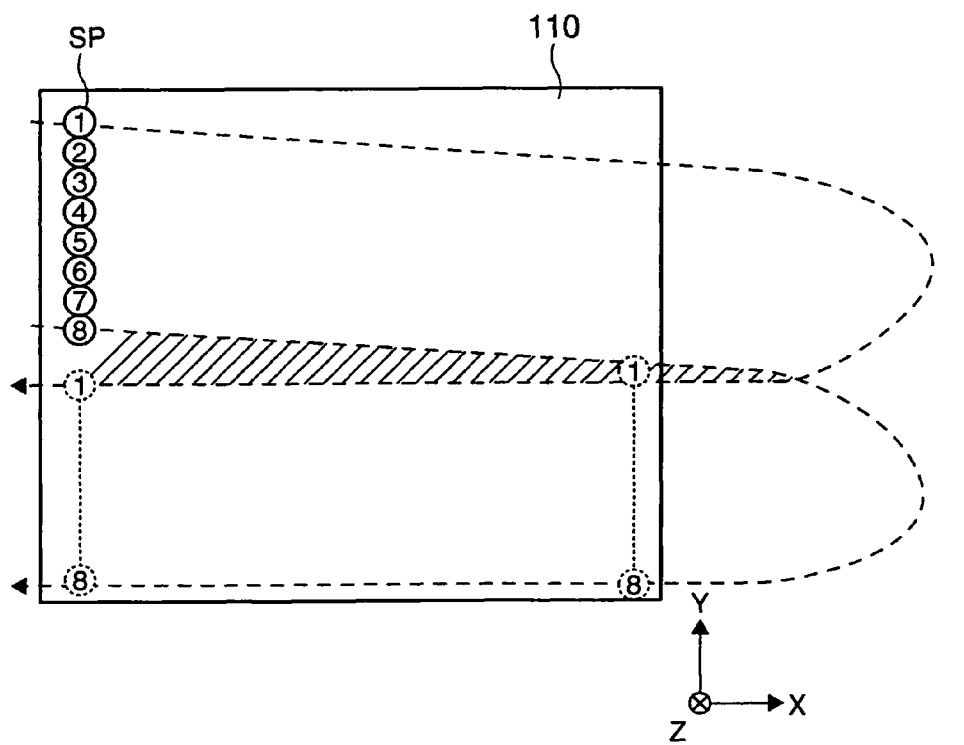
FIG. 7 shows scanning tracks in the case where respective spots are positioned in parallel only in a Y direction.

FIG. 7 illustrates a comparison example in which the eight spots SP arranged in parallel on the screen 110 only in the Y direction, showing problems caused in this case. In this structure, the time required for the eight laser beams to scan once in the X direction corresponds to the time required for a single laser beam to reciprocate four times in the X direction. Thus, in the case of eight spots SP produced in parallel in the Y direction, images can be displayed at a lower modulation frequency than in the case where a single laser beam is used. However, since laser beam scan in the X direction is performed at low speed, the shift amount of the laser beams in the Y direction during one laser beam scan in the X direction increases. Thus, a large clearance between tracks formed by the group of the spots shown by a hatched area in FIG. 7 is produced. Moreover, laser beam scan in the horizontal direction deviates from the horizontal direction of the screen to a diagonal direction.

Returning to FIG. 6, the light source sections 401 are disposed such that the spots SP can be produced in parallel in the X direction as well as in the Y direction in this embodiment. When the group of the spots SP having two rows in the Y direction and four rows in the X direction shift every two lines, the time required for the laser beams to scan once in the X direction corresponds to approximately one fourth of the time required for the eight spots SP shown in FIG. 7 to shift once in the X direction. Reduction of time required for one laser beam scan in the X direction can decrease the shift amount of the laser beams in the Y direction during one laser beam scan in the X direction. Thus, by disposing the light source sections 401 such that the spots SP can be produced in parallel in both the X direction and Y direction, the clearances created between the tracks formed by the group of the spots can be reduced compared with the case where the spots SP are positioned in parallel only in the Y direction. The image display apparatus 100 which reduces the clearances between the tracks formed by the group of the spots SP can display high quality images.

For 8-bit PWM executed using a single laser beam, the minimum pulse width t is used as a unit from pulse P1 representing 1 gradation to pulse P256 representing 256 gradations. The pulse width t of the pulse P1 is one 256th of the pulse width of the maximum pulse P256. The pulse minimum unit t decreases as the number of pixels and the number of the gradations in an image increase. When the eight spots SP are produced in parallel only in the Y direction, only one laser beam scans each of the pixels P during one scan. Thus, each of the eight laser beams individually represents gradations similarly to the case when a single laser beam scans. Thus, when the eight spots SP are produced in parallel only in the Y direction, modulation performed is similar to that in the case when a single laser beam scans except that scanning is divided among the eight laser beams and that the modulation frequency is lowered.

If the array of the light source sections 401 is shifted in the same manner as in the case where the light source sections are disposed such that the spots SP are produced in parallel only in the Y direction, similar problems occur in image display. In this embodiment, the point that gradation of each pixel P is represented by the four laser beams producing spots SP in parallel in the X direction is also different from the case where the spots SP are produced in parallel only in the Y direction. Since four spots are formed in the X direction and two spots are formed in the Y direction, the four laser beams successively scans each pixel P during one scan. Returning to FIG. 6, the gradation of one pixel P on the first line, for example, is represented by the four spots SP4, SP3, SP2 and SP1 each of which successively illuminates the position of this pixel P.

The four light source sections 401 associated with the spots SP1, SP2, SP3 and SP4 perform modulation for representing the gradation of the pixel P when the spots SP1, SP2, SP3 and SP4 pass the position of the pixel P. One pixel P on the second line is represented by the four spots SP8, SP7, SP6 and SP5 each of which successively illuminates the position of this pixel P. The four light source sections 401 associated with the spots SP5, SP6, SP7 and SP8 perform modulation for representing the gradation of the pixel P when the spots SP5, SP6, SP7 and SP8 pass the position of the pixel P.

One pixel P on the third line is represented by the four spots SP1, SP2, SP3 and SP4 each of which successively illuminates the position of this pixel P. The four light source sections 401 associated with the spots SP1, SP2, SP3 and SP4 perform modulation for representing the gradation of the pixel P when the spots SP1, SP2, SP3 and SP4 pass the position of the pixel P. One pixel P on the fourth line is represented by the four spots SP5, SP6, SP7 and SP8 each of which successively illuminates the position of this pixel P. The four light source sections 401 associated with the spots SP5, SP6, SP7 and SP8 perform modulation for representing the gradation of the pixel P when the spots SP5, SP6, SP7 and SP8 pass the position of the pixel P.

Figure 8:
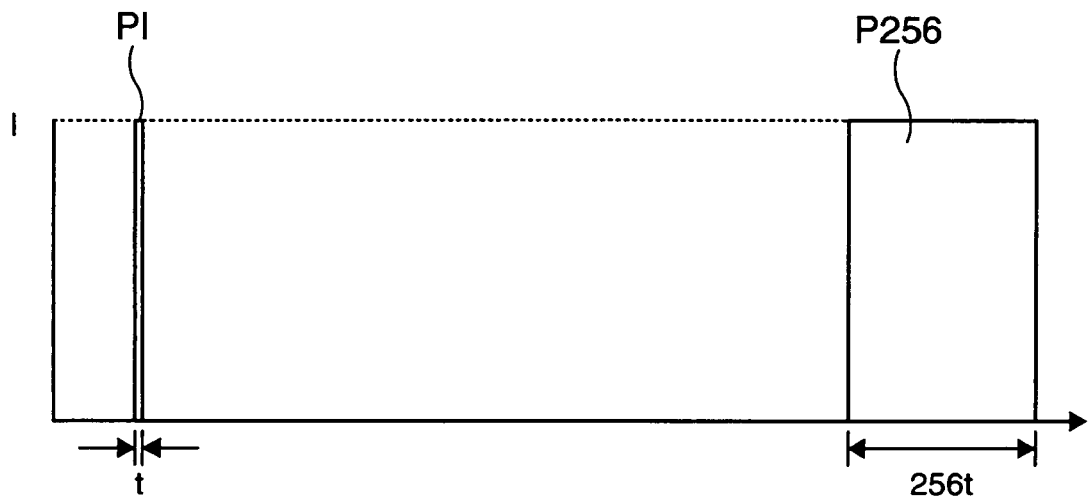
FIG. 8 shows pulses used for scan by a single laser beam.
Figure 9:
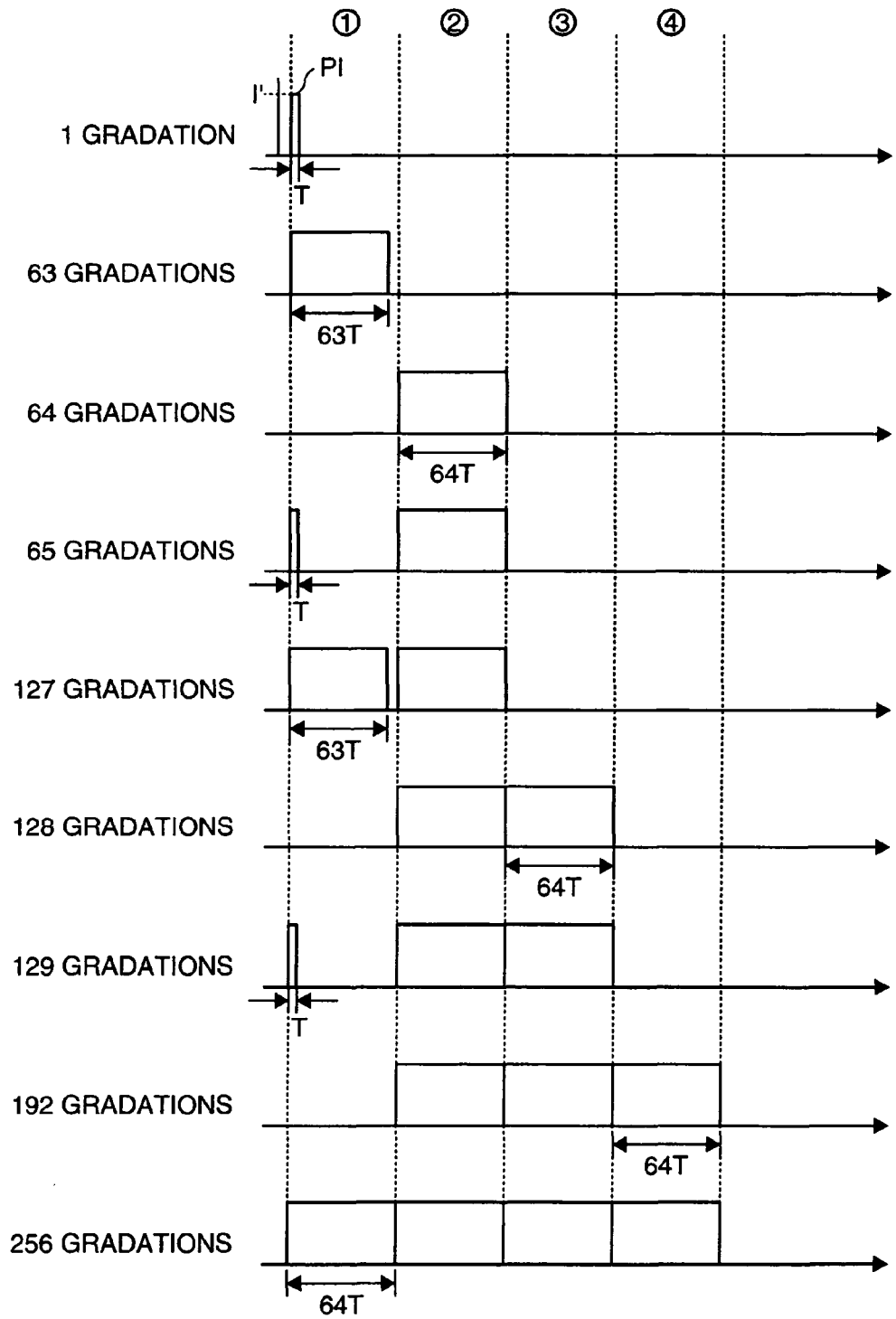
FIG. 9 shows pulses used in the invention.

FIG. 9 illustrates pulses used for 8-bit image display in the invention. FIG. 9, plotting amplitudes as the ordinate and time as the abscissa, shows gradations using the four laser beams producing the spots SP1, SP2, SP3 and SP4. In the image display apparatus 100 in this embodiment, a pulse amplitude I' is approximately one fourth of a pulse amplitude I in the related art shown in FIG. 8.

Considering that intensity of light to the eyes of the observer is represented by the product of light intensity and time period during which beams are turned on, the pulse width T of the pulse P1 as the minimum unit is approximately four times the pulse width t as the minimum unit shown in FIG. 8 when the amplitude I' is decreased to one fourth of the original amplitude I. Thus, when the pulse width is approximately four times the original pulse width and the amplitude I' is approximately one fourth of the original amplitude, the observer observes the same amount of light as that of the original light. The range from 1 gradation to 63 gradations is represented by a single pulse of the light source section 401 producing the spot SP1. For example, the representation of 63 gradations is provided by a single pulse having the pulse width of 63T.

For representing 64 gradations, the laser beam producing the spot SP2 is turned on for the time corresponding to the pulse width of 64T instead of the laser beam producing the spot SP1. The pulse width 64T corresponds to the pulse width 256t of the pulse P256 representing 256 gradations in the related art. The range from 65 gradations to 127 gradations is represented by the two laser beams producing the spots SP1 and SP2. In this range, the laser beam producing the spot SP2 is turned on for the time corresponding to the pulse width 64T, and the time period during which the laser beam for producing the spot SP1 is turned on is controlled according to gradations.

For representing 128 gradations, the two laser beams for producing the spots SP2 and SP3 are turned on for the time corresponding to the pulse width 64T. In the range from 129 gradations to 191 gradations, the two laser beams for producing the spots SP2 and SP3 are turned on for the time corresponding to the pulse width 64T, and the time period during which the laser beam for producing the spot SP1 is controlled according to gradations. For representing 192 gradations, the three laser beams for producing the spots SP2, SP3 and SP4 are turned on for the time corresponding to the pulse width 64T. In the range from 193 gradations to 256 gradations, the three laser beams for producing the spots SP2, SP3 and SP4 are turned on for the time corresponding to the pulse width 64T, and the time period during which the laser beam for producing the spot SP1 is controlled according to gradations.

In this embodiment, respective gradations are divided into parts of 64 gradations, which parts are represented by the respective light source sections 401. Since gradations are represented using the leaser beams emitted from the four light source sections 401, the power needed for gradation representation can be divided among the four light source sections 401. Thus, the output of the light source sections 401 can be reduced compared with the case where the entire gradations are represented by a laser beam emitted from a single light source section. Three laser beams out of the four require only switch on/off control, and the remaining one laser beam can perform the PWM with the minimum unit pulse width being four times larger than the original minimum unit pulse width. In this embodiment, while higher-speed laser beam scan is needed in the X direction than in the case where the spots SP are arranged in parallel only in the Y direction, images can be displayed at a lower modulation frequency. Thus, switching can be securely executed in accordance with pulses, and accurate images can be displayed in accordance with image signals. Since clearances are not produced between the scanning tracks of the laser beams and accurate images are displayed in accordance with image signals, high quality images can be created using a plurality of laser beams. Accordingly, scan can be divided among the plural laser beams, allowing high quality images to be displayed.

Figure 10:
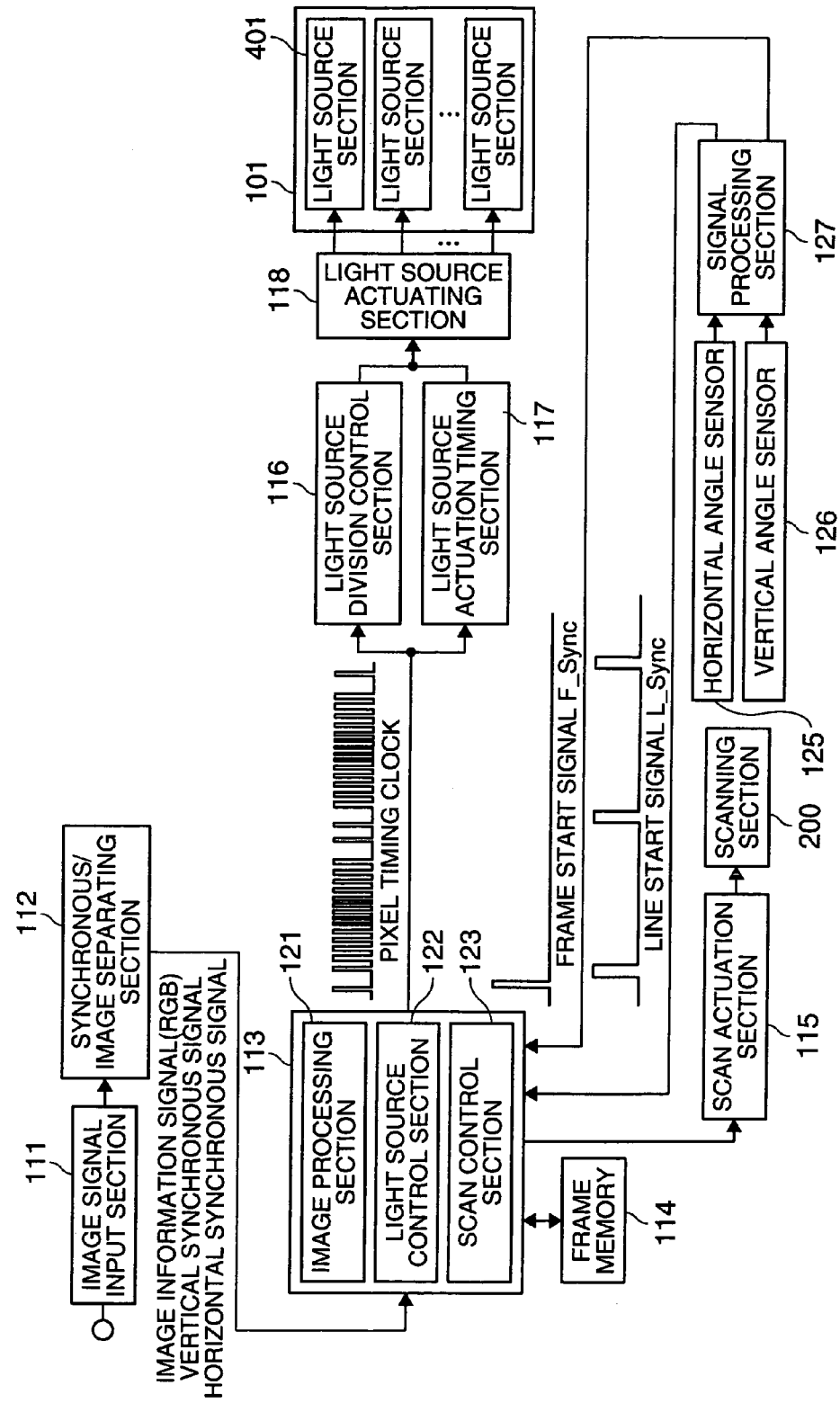
FIG. 10 shows a structure for controlling the light source sections.

FIG. 10 illustrates a structure for controlling the light source sections 401. An image signal input section 111 performs processing such as correcting characteristics of image signals inputted from an input terminal and amplifying the image signals. A synchronous/image separating section 112 separates signals coming from the image signal input section 111 into image information signals, vertical synchronous signals, and horizontal synchronous signals for each of the R light, G light and B light, and outputs the separated respective signals to a control section 113. A scan control section 123 of the control section 113 produces actuation signals for actuating the scanning section 200 based on the vertical synchronizing signals and horizontal synchronizing signals. A scan actuation section 115 actuates the scanning section 200 in response to the actuation signals coming from the control section 113.

A horizontal angle sensor 125 detects the angular displacement of the reflection mirror 202 (see FIG. 2) which directs the laser beams to scan on the screen 110 in the X direction. A vertical angle sensor 126 detects the angular displacement of the reflection mirror 202 (see FIG. 2) which directs the laser beams to scan on the screen 110 in the Y direction. A signal processing section 127 generates frame start signals F_Sync from the displacement of the vertical angle sensor 126 and line start signals L_Sync from the displacement of the horizontal angle sensor 125, and outputs the respective start signals to the control section 113.

An image processing section 121 divides image information inputted to the control section 113 for each scanning line, and outputs the divided information to a frame memory 114. The frame memory 114 stores the image signals outputted from the image processing section 121 for each frame. A light source control section 122 outputs image information signals for each line read out from the frame memory 114. The control section 113 produces pixel timing clocks based on the linear velocity calculated from the frame starting signals F_Sync and the line starting signals L_Sync, the vertical synchronous signals, and the horizontal synchronous signals. The pixel timing clocks indicate the time when laser beams pass the respective pixels and allow the laser beams modulated in accordance with the image signals to be introduced to the correct positions.

A light source division control section 116 determines which light source section 401 to be actuated based on the image information signals inputted from the control section 113. For example, the light source division control section 116 performs processing such as allocating the spots SP1, SP2, SP3 and SP4 to pixels of the odd number lines and the spots SP5, Sp6, SP7 and SP8 to pixels of the even number lines and dividing representation of gradations among the four laser beams. A light source actuation timing section 117 determines the timing for actuating the light source sections 401 such that the light source sections 401 can be turned on in synchronization with the pixel timing clocks. A light source actuating section 118 actuates the light source sections 401 allocated by the light source division control section 116 in accordance with the actuation timing determined by the light source actuation timing section 117. In this structure, the image display apparatus 100 can divide scan among the plural laser beams and thus can display high quality images.

In this embodiment, the arrangement of the light source sections 401 may have a structure other than that where the produced spots SP have four rows in the X direction and two rows in the Y direction as long as the spots SP can be formed in both the X direction and Y direction. Laser beam scan may be provided at intervals other than two lines as long as the number of the intervals is the same as that of the rows of the light source sections 401 for producing the spots SP in the Y direction. As for the scanning section 200, while the frequency at which laser beams scan in the X direction as the horizontal direction is not always higher than the frequency at which laser beams scan in the Y direction as the vertical direction in this embodiment, the scanning section 200 can be operated such that the frequency at which laser beams scan in the Y direction is higher than the frequency at which laser beams scan in the X direction. In this case, the Y direction corresponds to the first direction and the X direction corresponds to the second direction.

Second Embodiment

Figure 11:
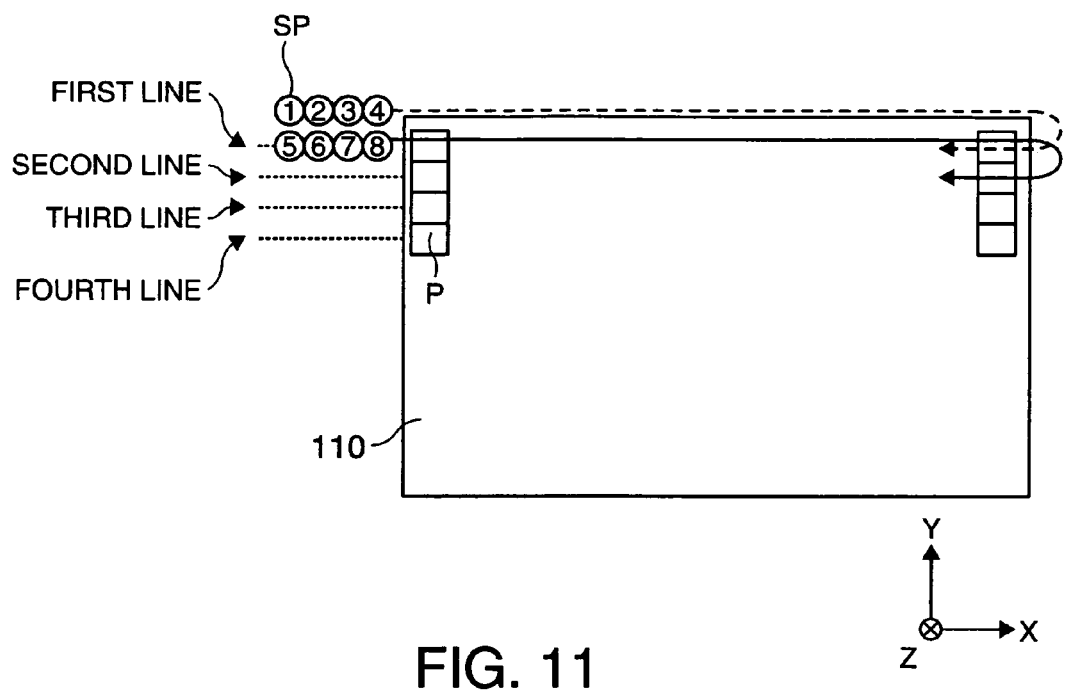
FIG. 11 is an explanatory view of an optical scanning device in a second embodiment according to the invention.

FIG. 11 is an explanatory view of an optical scanning device in a second embodiment according to the invention, and shows scanning tracks of laser beams emitted from the optical scanning device. The optical scanning device in this embodiment is applicable to the image display apparatus 100 in the above embodiment. The feature of this embodiment is that a scanning section provides laser beam scan on the screen 110 as the beam-receiving region in the X direction as the first direction at intervals of lines which number is smaller than the number of the rows of the spots positioned in parallel in the Y direction as the second direction. The optical scanning device in this embodiment has a structure similar to that of the optical scanning device 120 in the first embodiment except that laser beam scan is performed by the scanning section in a manner different from that in the first embodiment. Similar numerals are given to components and parts similar to those in the first embodiment and the same explanation is not repeated.

Similarly to the first embodiment, the light source sections are arranged such that the produced spots SP have two rows in the Y direction and four rows in the X direction. When the scanning section directs the respective laser beams to scan in the +X direction at the start of scan, the four spots SP5, SP6, SP7 and SP8 shift on the pixels P of the first line in the +X direction. After scan on the first line by the four spots SP5, SP6, SP7 and SP8 is completed, the scanning section changes the advancing direction of the respective laser beams from the +X direction to the −X direction. Then, the four spots SP1, SP2, SP3 and SP4 shift on the pixels P of the first line and the four spots SP5, SP6, SP7 and SP8 shift on the pixels P of the second line in the −X direction. While scan in the X direction is provided at two-line intervals while shifting the spots SP in the first embodiment, scan in the X direction is conducted at one-line intervals while shifting the spots SP in this embodiment. In this case, clearances between the tracks formed by the group of the spots SP can be reduced and thus high quality images can be displayed similarly to the case of the first embodiment.

When attention is given to one pixel P on the first line, the four spots SP8, SP7, SP6 and SP5 pass the position of this pixel P in this order during the laser beam scan in the +X direction and then the four spots SP1, SP2, SP3 and SP4 pass this position in this order during the laser beam scan in the −X direction. This embodiment is different from the first embodiment also in that the gradations of the respective pixels P are represented using eight laser beams. The eight light source sections corresponding to the spots SP1 through SP8 perform modulation for representing the gradations of the pixels P when the respective spots SP pass the positions of the pixels P.

For 8-bit image display in this embodiment, the representation of gradations can be divided among eight light source sections, each of which represents 32 gradations. In this embodiment, the light source sections can be controlled using pulses having amplitude decreased to approximately one eighth and minimum unit pulse width increased to approximately eight times larger compared with the case where gradations are represented by a single laser beam. Since gradations are represented using the laser beams emitted from the eight light source sections, power needed for gradation representation can be dividedly obtained from the eight light sources. Thus, the output of the light source sections can be reduced compared with the case where entire gradations are represented by a laser beam emitted from a single light source section.

In this embodiment, it is necessary to scan in the X direction at higher speed than in the first embodiment. While high-speed laser beam scan in the X direction is required, images can be displayed at a lower modulation frequency in this embodiment since the light source sections are controlled using pulses having the minimum unit pulse width increased to approximately eight times the original minimum unit pulse width. Thus, switching can be securely executed in accordance with pulses, and accurate images can be displayed in accordance with image signals. Since clearances are not produced between the scanning tracks of the laser beams and accurate images are displayed in accordance with image signals, high quality images can be created using a plurality of laser beams. Accordingly, laser beam scan can be divided among the plural laser beams, and high quality images can be displayed similarly to the first embodiment.

Figure 12:
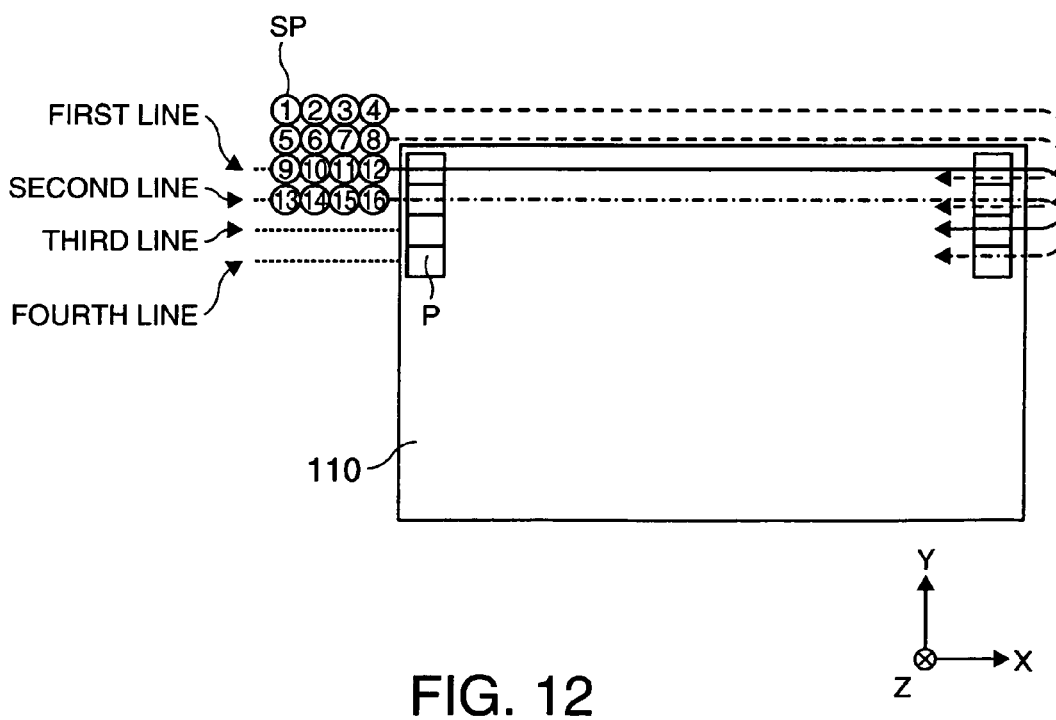
FIG. 12 is an explanatory view of an optical scanning device in a modified example of the second embodiment according to the invention.
Figure 13:
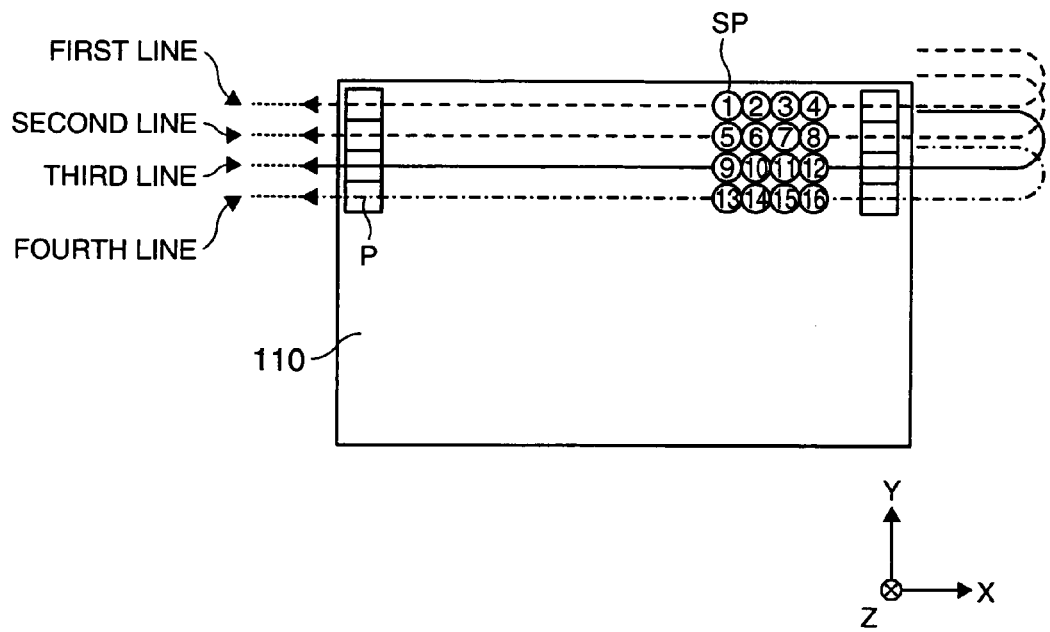
FIG. 13 is an explanatory view of the optical scanning device in the modified example of the second embodiment according to the invention.

FIGS. 12 and 13 are explanatory views of an optical scanning device in a modified example of this embodiment, and shows scanning tracks of laser beams emitted from the optical scanning device. The feature of this modified example is also that a scanning section provides laser beam scan in the X direction at intervals of lines which number is smaller than the number of the rows of the spots positioned in parallel in the Y direction. It is still another feature of this modified example that the spots SP of particular lines are extracted from the spots SP positioned in parallel in the Y direction as the second direction to represent gradations using the groups of the light source sections for producing the spots SP of the extracted lines.

In this modified example, the light source sections are disposed such that the produced spots SP have four rows in the Y direction and four rows in the X direction. As illustrated in FIG. 12, when the scanning section directs the respective laser beams to scan in the +X direction at the start of scan, four spots SP9, SP10, SP11 and SP12 shift on the pixels P of the first line in the +x direction. Also, four spots SP13, SP14, SP15 and SP16 shift on the pixels P of the second line in the +X direction. After scan on the first line by the four spots SP9, SP10, SP11 and SP12 and scan on the second line by the four spots SP13, SP14, SP15 and SP16 are completed, the scanning section changes the advancing direction of the respective laser beams from the +X direction to the −X direction.

Subsequently, when the scanning section directs the respective laser beams in the −X direction as illustrated in FIG. 13, the four spots SP1, SP2, SP3 and SP4 and the four spots SP5, SP6, SP7 and SP8 shift on the pixels of the first line and the second line, respectively. Simultaneously, the four spots SP9, SP10, SP11 and SP12 and the four spots SP13, SP14, SP15 and SP16 shift on the pixels of the third line and the fourth line, respectively. When attention is given to one pixel P of the first line, the four spots SP12, SP11, SP10 and SP9 pass the position of this pixel P in this order during the laser beam scan in the +X direction and then the four spots SP1, SP2, SP3 and SP4 pass this position in this order during the laser beam scan in the −X direction. The eight light source sections corresponding to the spots SP1 through SP4 and SP9 through SP12 perform modulation for representing the gradations of the pixels P when the respective spots SP pass the positions of the pixels P.

When attention is given to one pixel P of the second line, the four spots SP16, SP15, SP14 and SP13 pass the position of this pixel P in this order during the laser beam scan in the +X direction and then the four spots SP5, SP6, SP7 and SP8 pass the corresponding position in this order during the laser beam scan in the −X direction. The eight light source sections corresponding to the spots SP5 through SP8 and SP13 through SP16 perform modulation for representing the gradations of the pixels P when the respective spots SP pass the positions of the pixels P.

In this modified example, the gradations of the pixels P on the odd number lines such as the third line are represented using the eight light sources corresponding to the spots SP1 through SP4 and SP9 through SP12 similarly to the gradations of the pixels P of the first line. On the other hand, the gradations of the pixels P on the even number lines such as the fourth line are represented using the eight light sources corresponding to the spots SP5 through SP8 and SP13 through SP16 similarly to the gradations of the pixels P of the second line. Thus, in the optical scanning device of this modified example, the gradations of the pixels P on the odd number lines are represented using the groups of the scanning sections for producing the spots SP1 through SP4 on the first line and the spots SP9 through SP12 on the third line extracted from the spots SP positioned in parallel in the Y direction. On the other hand, the gradations of the pixels P on the even number lines are represented using the groups of the scanning sections for producing the spots SP5 through SP8 on the second line and the spots SP13 through SP16 on the fourth line extracted from the spots SP positioned in parallel in the Y direction.

The optical scanning device in this modified example need to satisfy only the following requirements (1) through (3).

(1) The scanning section directs the laser beams to scan in the X direction as the first direction at intervals of n lines (n is a positive integer) on the screen as the beam-receiving region.

(2) The light source sections produce m×n spots SP (m is a positive integer) positioned in parallel in the Y direction as the second direction on the screen.

(3) Gradations are represented using the group of m light sources selected for each value of k (k=0,1, up to n−1) for producing the spots SP on the (hn−k)th line (h=1, 2, up to m) in the Y direction as the second direction.

In the optical scanning device of this modified example explained with reference to FIGS. 12 and 13, n and m are both 2 satisfying the requirements (1) and (2). The gradations of the pixels P on odd number lines are represented using the groups of two light source sections for the (2h−1)th line selected when k=1 (=n−1) in the Y direction. The groups of the light source sections for representing the gradations of the pixels P on the odd number lines are constituted by the group of the light source sections for producing the spots SP1 through SP4 on the first line when h=1 and the group of the light source sections for producing the spots SP9 through SP12 on the third line when h=2 (=m). The gradations of the pixels P on even number lines are represented using the groups of two light source sections for (2h)th selected when k=0 in the Y direction. The groups of the light source sections for representing the gradations of the pixels P on the even number lines are constituted by the group of the light source sections for producing the spots SP5 through SP8 on the second line when h=1 and the group of the light source sections for producing the spots SP13 through SP16 on the fourth line when h=2 (=m). By this method, the optical scanning device in this modified example represents gradations using m light source sections selected for each value of k. Accordingly, in the optical scanning device of this modified example, scan can be divided among the plural laser beams and high quality images can be displayed similarly to the above examples.

When n=3 and m=2, for example, gradation representation provided through scan at three-line intervals is divided among the group of the light source sections for producing the spots SP on the first and fourth lines when k=2 (=n−1), the group of the light source sections for producing the spots SP on the second and fifth lines when k=1, and the group of the light source sections for producing the spots SP on the third and sixth lines when k=0. By using the optical scanning device which provides laser beam scan satisfying the requirements (1), (2) and (3), scan can be divided among the plural laser beams and high quality images can be displayed.

Third Embodiment

Figure 14:
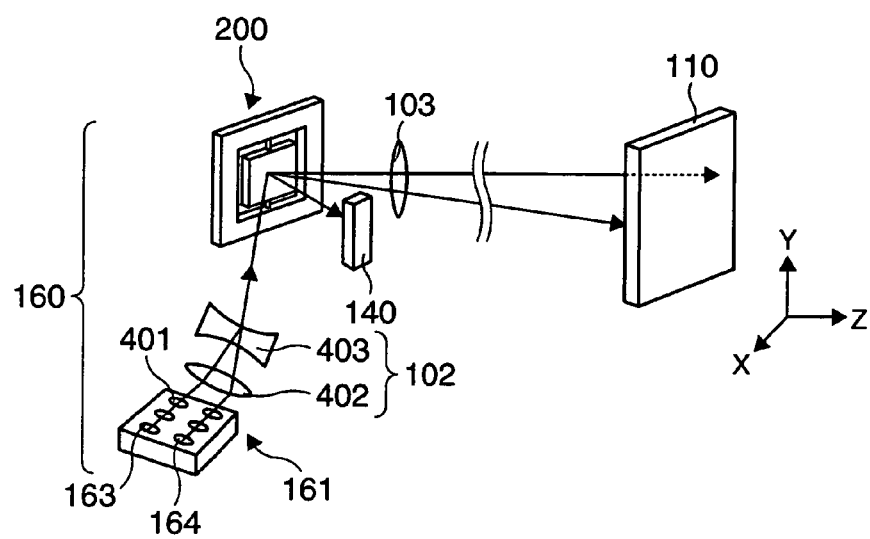
FIG. 14 illustrates a structure and the like of an optical scanning device in a third embodiment according to the invention.

FIG. 14 shows a structure of an optical scanning device 160 in a third embodiment according to the invention and optical paths of laser beams emitted from the optical scanning device 160. The optical scanning device 160 in this embodiment is applicable to the image display apparatus 100 in the above embodiments. The optical scanning device 160 is characterized by including backup light source sections 163 and 164. Similar reference numerals are given to similar parts and components to those in the first embodiment, and the same explanation is not repeated.

A light source array 161 has four light source sections 401 and two backup light source sections 163 and 164. The backup light source sections 163 and 164 have the same structure as that of the light source sections 401. The scanning section 200 directs laser beams to the screen 110 and a light detection section 140 positioned on the +X side of the screen 110 as viewed from the scanning section 200. The light detection section 140 is formed by a photo-transistor or a photo-cell, for example.

Figure 15:
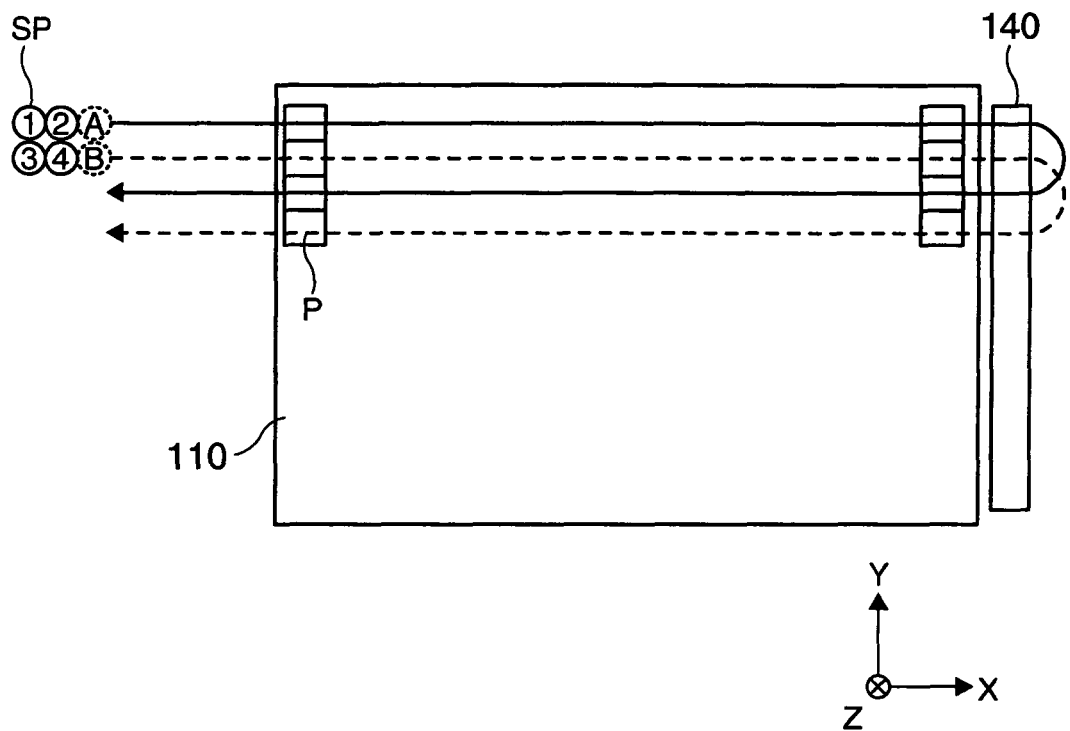
FIG. 15 shows scanning tracks of laser beams on the screen.

FIG. 15 shows scanning tracks of laser beams on the screen 110. In this figure, reference numerals 1 through 4 are given to the respective four spots SP produced on the screen 110 by the four light source sections 401. When laser beams are emitted from the backup light sources 163 and 164 to the screen 110, spots SPA and SPB are produced by the laser beams emitted from the backup light source sections 163 and 164, respectively. The backup light source section 163 is disposed such that the spots SPA can be produced next to the spot SP2 on the +X side. The backup light source section 164 is disposed such that the spots SPB can be produced next to the spot SP4 on the +X side.

When the laser beams are normally supplied from the four light source sections 401, the optical scanning device 160 supplies laser beams from the light source sections 401 in accordance with image signals. The four laser beams scan on the screen 110 in the +X direction and pass through the light detection section 140, and then the scan direction changes to the −X direction. The four laser beams whose scan direction is changed to the −X direction pass through the light detection section 140, and then scan on the screen 110 in the −X direction. Each laser beam scan in this embodiment is performed in the same manner as in the first embodiment except that the laser beams pass through the light detection section 140. The backup light source section 163 does not supply laser beams when laser beams are normally supplied from the two light source sections 401 for producing the spots SP1 and SP2. The backup light source section 164 does not supply laser beams when laser beams are normally supplied from the two light source sections 401 for producing the spots SP3 and SP4.

The backup light source section 163 supplies laser beams in substitution for either of the two light source sections 401 for producing the spots SP1 and SP2 positioned in parallel in the X direction as the first direction. For example, when the light source for producing the spot SP1 stops supplying laser beams due to failure, the backup light source section 163 supplies laser beams in place of the light source section 401 for producing the spot SP1 and beams modulated according to image signals are supplied using the backup light source section 163 and the light source section 401 for producing the spot SP2. The backup light source section 164 supplies laser beams in substitution for either of the two light source sections 401 for producing the spots SP3 and SP4 positioned in parallel in the X direction similarly to the backup light source section 163.

Figure 16:
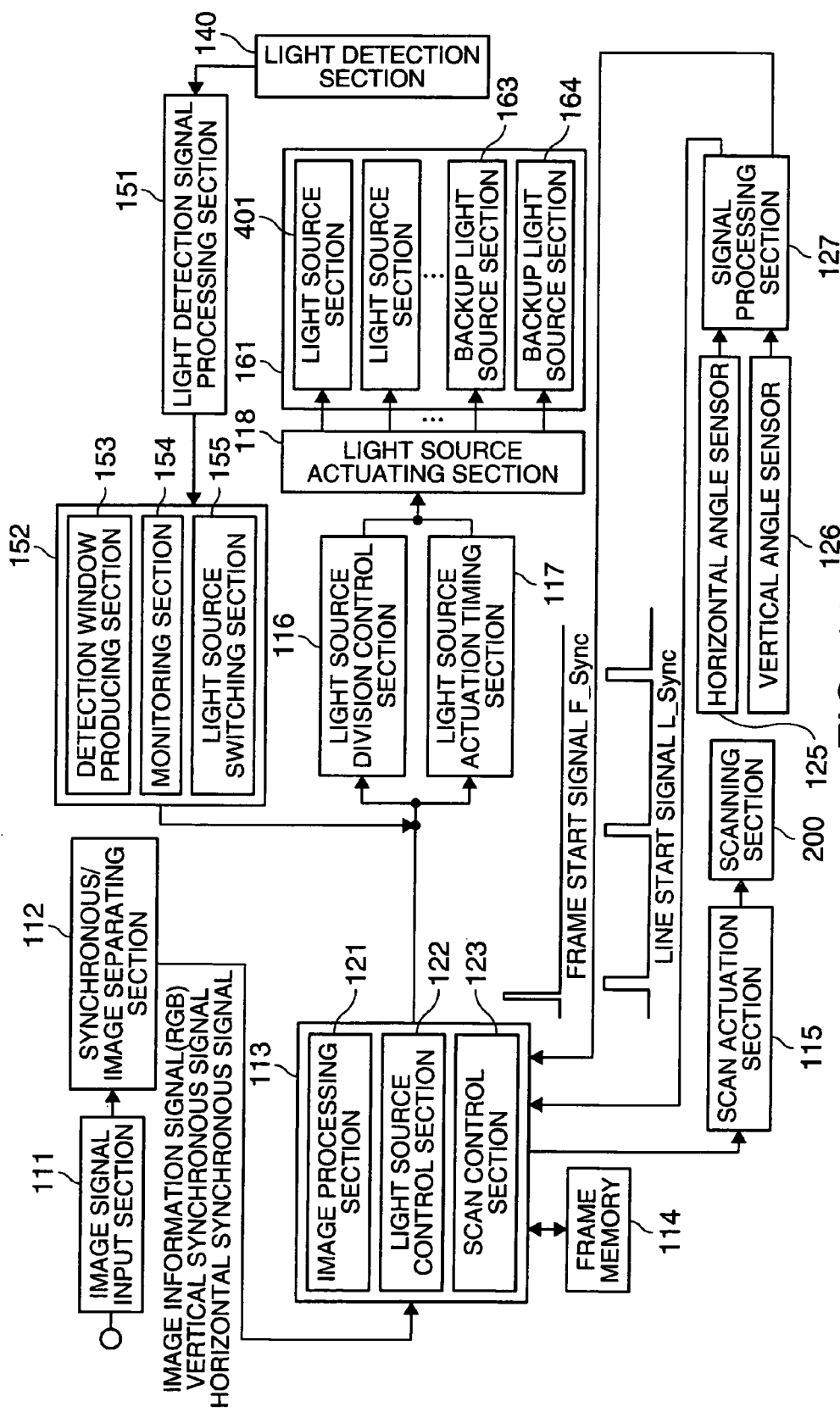
FIG. 16 shows a structure for controlling the light source sections and backup light source sections.

FIG. 16 shows a structure for controlling the light source sections 401 and the backup light source sections 163 and 164. The light source actuating section 118 controls the respective light source sections 401 such that laser beams emitted from the respective light source sections 401 have predetermined intensity such as intensity required for displaying the maximum gradation when the laser beams enter the light detection section 140. The detection results obtained by the light detection section 140 are outputted to a light detection signal processing section 151. The signals to which processing is applied by the light detection signal processing section 151 are inputted to a specifying section 152. The specifying section 152 specifies any of the light source sections 401 which supplies laser beams having intensity lower than a predetermined value. The specifying section 152 has a detection window producing section 153, a monitoring section 154, and a light source switching section 155. Instead of providing the light detection section 140, the horizontal angle sensor 125 or the vertical angle sensor 126 may have the function of the light detection section. In this case, the horizontal angle sensor 125 or the vertical angle sensor 126 functions as the light detection section.

Figure 17:
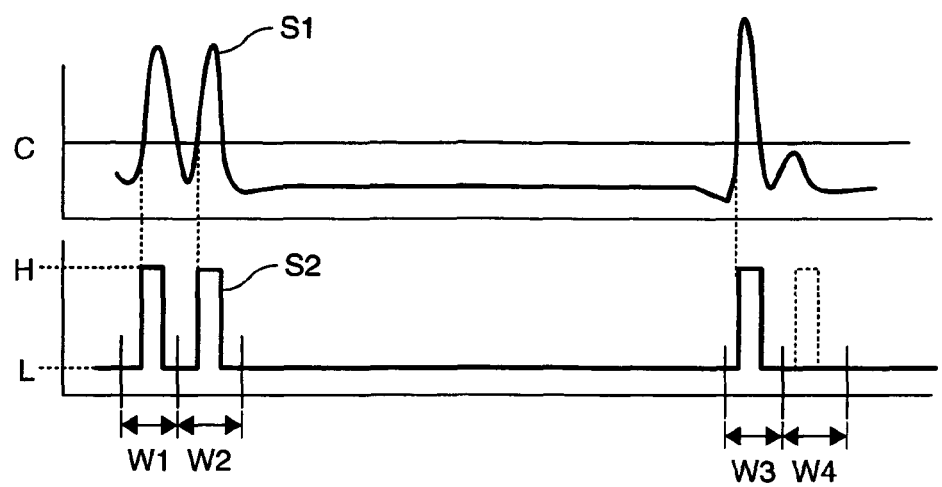
FIG. 17 shows signal processing and the like performed by a light detection signal processing section.

FIG. 17 shows signal processing by the light detection signal processing section 151 and the specifying step for specifying the light source sections 401 by the specifying section 152. A curve S1 shows signals outputted from the light detection section 140 in the graph plotting intensity as the ordinate and time as the abscissa. While the two light source sections 401 for producing the spots SP in parallel in the X direction are normally supplying laser beams, laser beams having approximately the same intensity successively pass through the light detection section 140. In this case, two successive peaks are detected. The light detection signal processing section 151 produces, from the signal S1 outputted from the light detection section 140, a rectangular signal S2 which reaches H when intensity of light of a predetermined value C or higher is detected.

The detection window producing section 153 (see FIG. 16) produces detection windows W1, W2, W3 and W4 when the laser beams pass through the light detection section 140. For example, when the signal S2 is in the H state in the detection window W1, the monitoring section 154 (see FIG. 16) determines that the light source section 401 directing the laser beams to pass through the light detection section 140 at the time of the detection window W1 is normally supplying laser beams having at least the predetermined intensity. Thus, the detection results obtained from the light detection section 140 can be associated with the respective light source sections 401 using the detection windows. The respective light source sections 401 for producing the spots SP in parallel in the Y direction direct laser beams to pass through the light detection section 140 simultaneously with each other. However, it is possible, for example, to identify the respective light source sections 401 for producing the spots SP in parallel in the Y direction from their entering positions to the light detection section 140 in the Y direction. The four light sections 401 are operated as long as the monitoring section 154 determines that all the light source sections 401 are supplying laser beams having at least the predetermined intensity.

When the laser beam intensity indicated by the signal S1 outputted from the light detection section 140 is lower than the predetermined value C, the light detection signal processing section 151 outputs the signal S2 in the L state at the time when the intensity is lower than the predetermined value C. For example, when the signal S2 does not reach H but remains L at the detection window W4, the monitoring section 154 determines that the light source sections 401 directing laser beams to pass through the light detection section 140 at the time of the detection window W4 is abnormal and does not supply laser beams having at least the predetermined intensity. By this method, the light source section 401 which supplies laser beams having intensity lower than the predetermined value can be specified from the plural light source sections 401 based on the detection results outputted from the light detection section 140.

The light source switching section 155 stops actuation of the light source section 401 which is not supplying laser beams having at least the predetermined intensity according to the determination by the monitoring section 154, and starts actuation of the backup light source section 163 or 164. When it is determined that either of the two light source sections 401 for producing the spots SP1 and SP2 positioned in parallel in the X direction is abnormal, actuation switches from the light source section 401 determined as abnormal to the backup light source section 163. When it is determined that either of the two light source sections 401 for producing the spots SP3 and SP4 positioned in parallel in the X direction is abnormal, actuation switches from the light source section 401 determined as abnormal to the backup light source section 164.

The light source division control section 116 selects the light source sections 401 to be actuated considering the outputs from the specifying section 152. In case that switchover from the light source section 401 to the backup light source section 163 or 164 has been made, the light source division control section 116 allocates image information which is to be allocated to the light source section 401 determined as abnormal to the backup light source section 163 or 164. The backup light source section 163 or 164 thus supplies laser beams in place of the light source section 401 of the plural light source sections 401, which is specified as the abnormal light source section supplying laser beams having intensity lower than the predetermined value.

Since the backup light source sections 163 and 164 supply laser beams in substitution for the light source section 401 specified as the abnormal light source section supplying laser beams having intensity lower than the predetermined value, it is possible to continuously display images even when any of the light source sections 401 is abnormal. Moreover, since the backup light source sections 163 and 164 are disposed next to the plural light source sections 401 for producing the spots in parallel in the X direction as the first direction, the backup light source sections 163 and 164 can easily substitute for the light source section 401 which cannot normally supply beams.

It is possible to use the backup light source sections 163 and 164 in place of any of the light source sections 401 which is defective at the time of manufacture as well as in place of any of the light source sections 401 which cannot supply normal amount of beams after manufacture. By actuating the backup light sources 163 and 164 in substitution for the light source section 401 which is detective at the time of manufacture, yield increases and manufacturing cost lowers, thereby enhancing the reliability. The number of the backup light source sections is not limited to one but may be plural for the plural light source sections 401 for producing the spots in parallel in the X direction. In this case, the intensity of laser beams from the backup light source sections as well as from the light source sections 401 may be monitored such that another backup light source can be used if any of the backup light source sections cannot normally supply laser beams.

Figure 18:
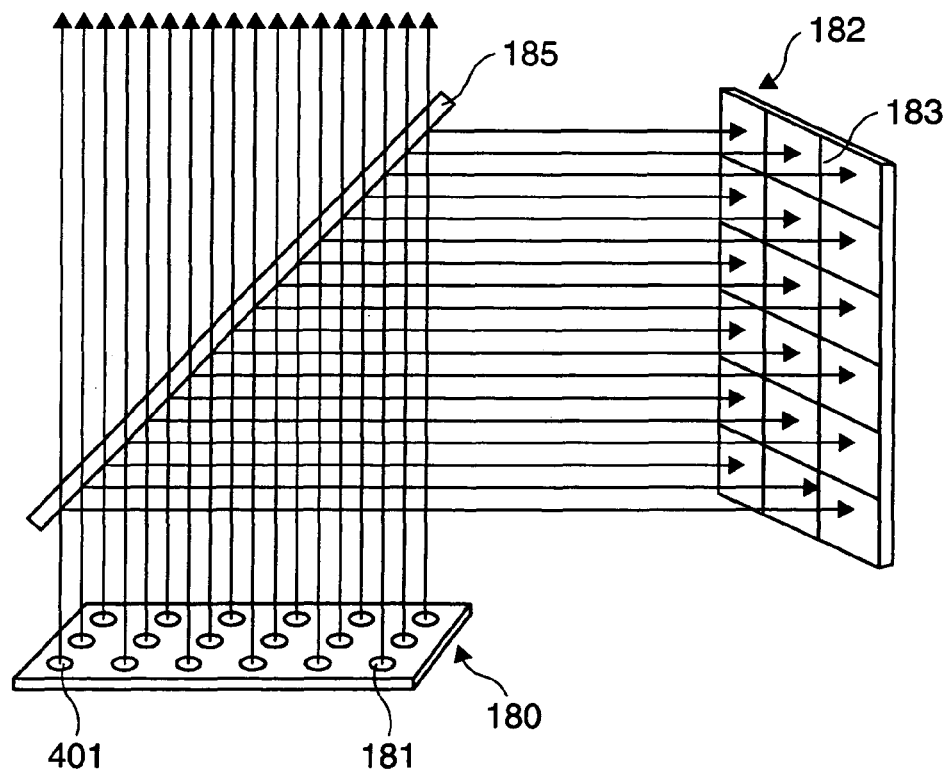
FIG. 18 is an explanatory view of an optical scanning device in a modified example of the third embodiment.

FIG. 18 schematically shows a structure of a part in an optical scanning device in a modified example of this embodiment, on which part a light source array 180 and a light detection array 182 are disposed. The optical scanning device of this modified example is different from the above optical scanning device 160 in that the light detection array 182 having an array of light detection sections 183 is provided. The light source array 180 includes an array of 3×5 light source sections 401, and three backup light source sections 181 disposed in parallel with the light source sections 401. A semi-transmissive plate 185 is provided on the light exit side of the light source array 180. The semi-transmittive plate 185 reflects a part of entering laser beams and transmits another part thereof. The laser beams passing through the semi-transmissive plate 185 are directed to scan by the scanning section.

The light detection array 182 is disposed such that the laser beams reflected by the semi-transmissive plate 185 can reach the light detection array 182. The respective light detection sections 183 provided on the light detection array 182 are disposed at positions in correspondence with the positions of the respective light source sections 401 and backup light source sections 181. Laser beams having intensity in accordance with the reflectance of the semi-transmissive plate 185 enter the respective light detection sections 183. The respective light detection sections 183 detect the laser beams reflected by the semi-transmissive plate 185. In this modified example, whether the respective light source sections 401 are normally supplying laser beams or not is determined by monitoring the intensity of the laser beams reflected by the semi-transmissive plate 185.

Figure 19:
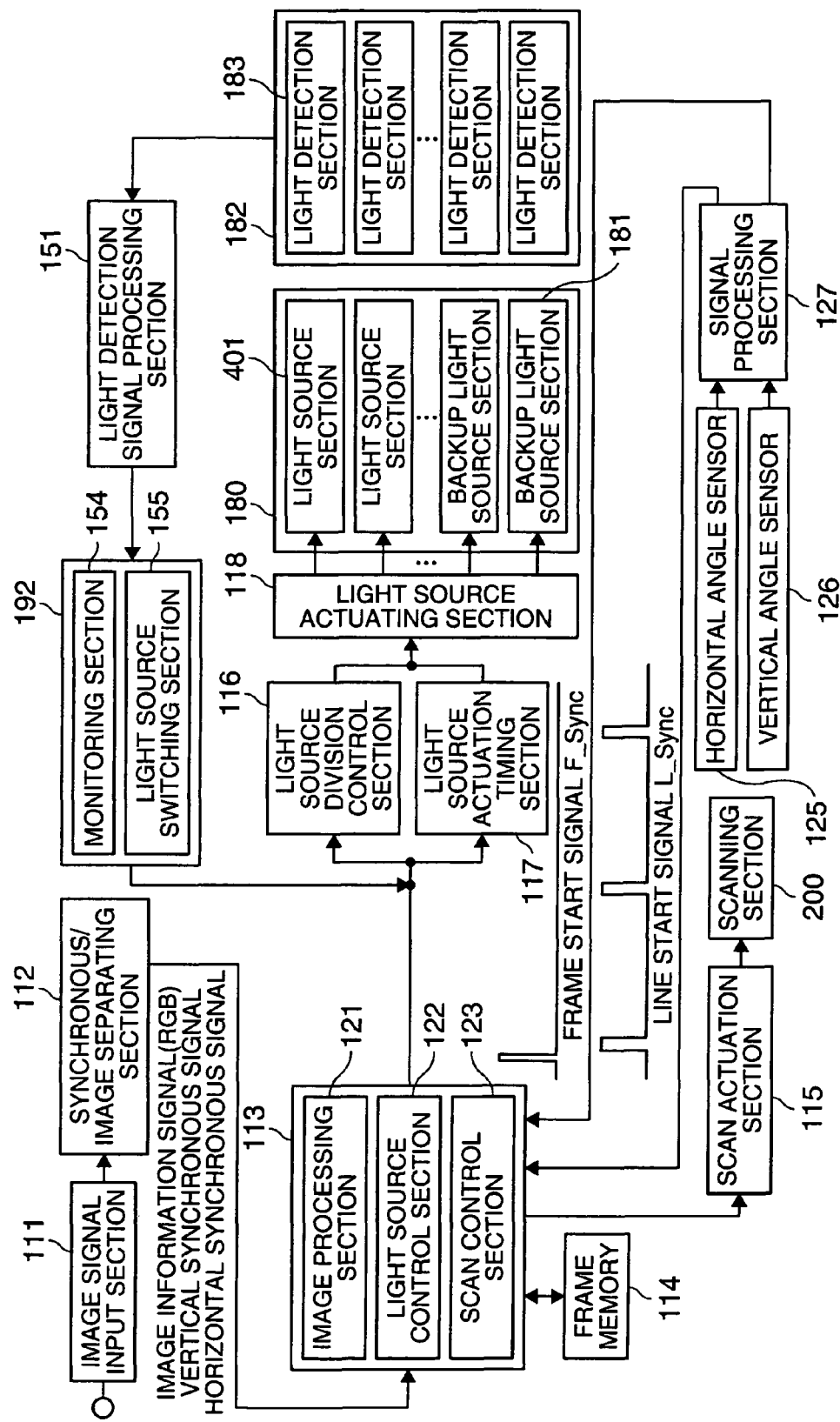
FIG. 19 shows a structure for controlling the light source sections and backup light source sections.

FIG. 19 shows a structure for controlling the light source sections 401 and the backup light source sections 181. The detection results obtained by the respective light detection sections 183 are outputted to the light detection signal processing section 151. Since the detection results from the respective light detection sections 183 are associated with the respective light source sections 401 when the results are outputted, the detection window producing section is not required in this modified example. A specifying section 192 specifies any of the light source sections 401 which supplies a lower amount of light than a predetermined amount based on the detection results from the respective light detection sections 183. Accordingly, the reliability can be enhanced similarly to the case of the above optical scanning device 160.

Fourth Embodiment

Figure 20:
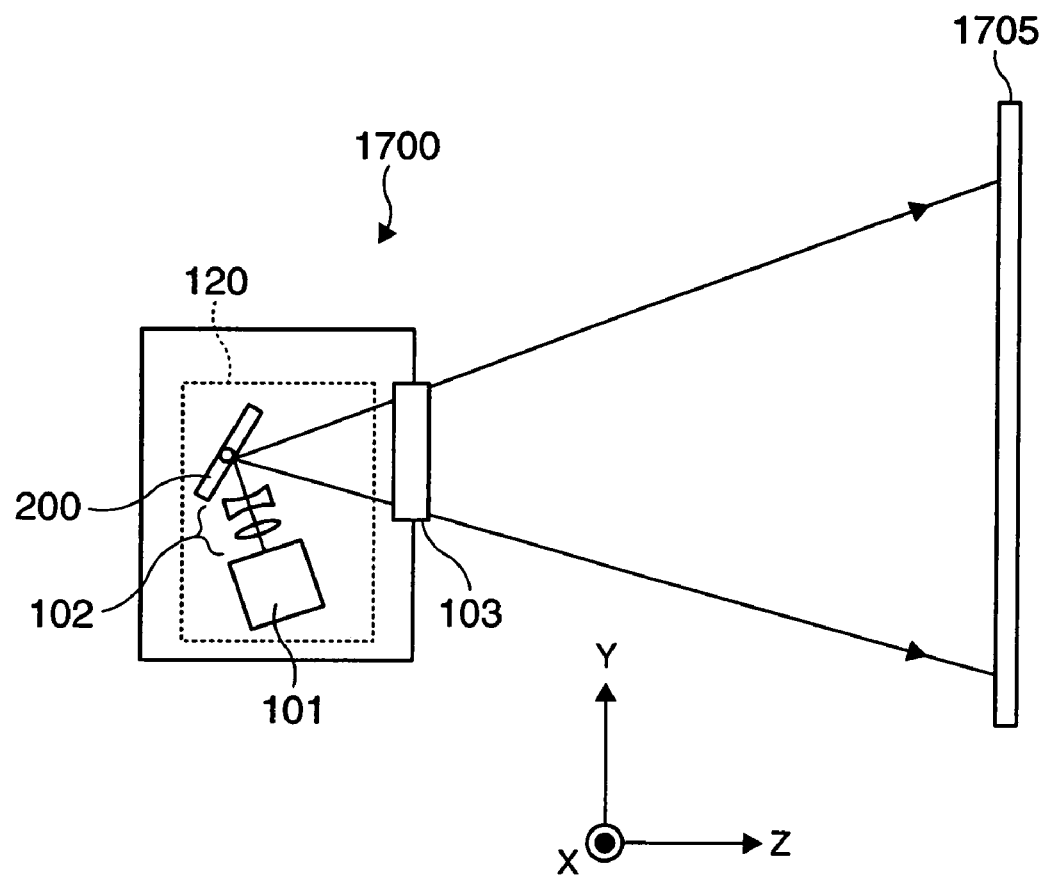
FIG. 20 schematically illustrates an image display apparatus in a fourth embodiment according to the invention.

FIG. 20 schematically illustrates a structure of an image display apparatus 1700 in a fourth embodiment according to the invention. The image display apparatus 1700 is a so-called front projection type projector which supplies laser beams to a screen 1705 provided on the observer side so that the observer can see light reflected by the screen 1705 as images. The image display apparatus 1700 includes the optical scanning device 120 similarly to the case of the first embodiment. Similar reference numerals are given to similar parts and components, and the same explanation is not repeated. The laser beams emitted from the optical scanning device 120 pass through the projection optical system 103, and then enters the screen 1705. In this embodiment, it is also possible to divide scan among a plurality of laser beams and display high quality images.

In the respective embodiments, the optical scanning device uses the light source sections 401 for supplying laser beams. However, the optical scanning device may have other structure as long as the optical scanning device can supply beams of light. For example, the light source sections 401 may be formed by solid light-emitting elements such as light-emitting diodes (LEDs). Additionally, the optical scanning device according to the invention may be applied to an electronic device for providing laser beam scan such as a laser printer other than the image display apparatus.

As apparent from above, the optical scanning device according to the invention is preferably used in an image display apparatus which provides optical scan in accordance with image signals.

The entire disclosure of Japanese Patent Application No. 2005-117876, filed Apr. 15, 2005 is expressly incorporated by reference herein.

What is claimed is:

1. An optical scanning device, comprising:
a light source array comprising a plurality of light source sections arranged in a two-dimensional pattern for supplying light beams;
the two-dimensional pattern having a first direction and a second direction that is different from the first direction;
a light source division control section that divides a gradation of each pixel of a plurality of pixels among the plurality of light source sections by allocating an array of spots produced from the light beams of light source sections arranged along one of the first direction or the second direction to each pixel of the plurality of pixels,
a scanning section for directing the light beams emitted from the light source sections to scan on a beam-receiving region in a first beam-receiving direction and a second beam-receiving direction that is substantially perpendicular to the first beam-receiving direction,
wherein:
the scanning section is operated such that a frequency at which the light beams scan in the first beam-receiving direction is higher than a frequency at which the light beams scan in the second beam-receiving direction; and
wherein a respective gradation of each pixel of the plurality of pixels is represented by spots produced by the light beams of the light source sections arranged along the one of the first direction or the second direction successively illuminating each pixel of the plurality of pixels.

2. An optical scanning device according to claim 1, wherein the light beams scan in the first beam-receiving direction at intervals of lines which number is the same as that of spots positioned in parallel on the beam-receiving region in the second beam-receiving direction.

3. An optical scanning device according to claim 1, wherein the light beams scan in the first beam-receiving direction at intervals of lines which number is smaller than that of spots positioned in parallel on the beam-receiving region in the second beam-receiving direction.

4. An optical scanning device according to claim 3, wherein:
the scanning section directs the light beams to scan in the first beam-receiving direction at intervals of n lines (n: positive integer) on the beam-receiving region;

the light source sections produce m×n spots (m: positive integer) in parallel on the beam-receiving region in the second beam-receiving direction, and provide gradation using m pieces of the light source sections that are selected for each k and produce spots on the (hn−k)th line (k=0, 1, up to n-1; h=1, 2, up to m) in the second beam-receiving direction.

5. An optical scanning device according to claim 1, further comprising a backup light source section that supplies light beams in substitution for any of the plurality of light source sections producing spots in parallel in the first beam-receiving direction.

6. An optical scanning device according to claim 5, further comprising a light detection section for detecting light beams emitted from the plurality of light source sections, wherein the backup light source section supplies light beams in substitution for any of the plural light source sections which is determined as a light source section supplying light beams having an intensity lower than a predetermined value based on detection results from the light detection section.

7. An image display apparatus for displaying images using light emitted from an optical scanning device, comprising the optical scanning device according to claim 1.

8. A control method of an optical scanning device, comprising:
   supplying light beams from a plurality of light source sections that are arranged in a two-dimensional pattern along a first direction and a second direction that is different from the first direction;
   dividing a gradation of each pixel of a plurality of pixels among the plurality of light source sections by allocating an array of spots produced from the light beams of light source sections arranged along one of the first direction or the second direction to each pixel of the plurality of pixels; and
   directing the light beams emitted from the light source sections to scan on a beam-receiving region in a first beam-receiving direction and a second beam-receiving direction that is substantially perpendicular to the first beam-receiving direction, wherein:
   a frequency that the light beams scan in the first beam-receiving direction is higher than a frequency at which the light beams scan in the second beam-receiving direction ; and
   a respective gradation of each pixel of the plurality of pixels is represented by spots of the array of spots produced by the light beams of the light source sections arranged along the one of the first direction or the second direction successively illuminating each pixel of the plurality of pixels.

9. A control method of an optical scanning device according to claim 8, further comprising:
   detecting the light beams emitted from the light source sections;
   specifying any of the plurality of light source sections that is supplying beams having an intensity lower than a predetermined value based on obtained detection results; and
   supplying substitute beams from a backup light source section in substitution for the light source section specified from the plurality of light source sections.

* * * * *